United States Patent
Huska et al.

(10) Patent No.: US 10,068,728 B2
(45) Date of Patent: Sep. 4, 2018

(54) TOUCHPAD WITH CAPACITIVE FORCE SENSING

(75) Inventors: Andrew P. Huska, Post Falls, ID (US); Douglas M. Krumpelman, Hayden, ID (US); Cody G. Peterson, Coeur d'Alene, ID (US)

(73) Assignee: Synaptics Incorporated, San Jose, CA (US)

( * ) Notice: Subject to any disclaimer, the term of this patent is extended or adjusted under 35 U.S.C. 154(b) by 532 days.

(21) Appl. No.: 13/082,293

(22) Filed: Apr. 7, 2011

(65) Prior Publication Data
US 2011/0227872 A1 Sep. 22, 2011

Related U.S. Application Data

(60) Provisional application No. 61/347,768, filed on May 24, 2010.

(51) Int. Cl.
| | |
|---|---|
| G06F 3/01 | (2006.01) |
| H01H 13/85 | (2006.01) |
| G06F 3/041 | (2006.01) |
| H01H 3/00 | (2006.01) |

(52) U.S. Cl.
CPC ............ *H01H 13/85* (2013.01); *G06F 3/016* (2013.01); *G06F 3/0414* (2013.01); *H01H 2003/008* (2013.01); *H01H 2215/05* (2013.01)

(58) Field of Classification Search
USPC ................. 345/174, 173, 157, 156
See application file for complete search history.

(56) References Cited

U.S. PATENT DOCUMENTS

| | | |
|---|---|---|
| 3,886,341 A | 5/1975 | Forrest |
| 4,334,280 A | 6/1982 | Mcdonald |
| 4,403,123 A | 9/1983 | Shek |

(Continued)

FOREIGN PATENT DOCUMENTS

| | | |
|---|---|---|
| DE | 19704253 A | 8/1998 |
| DE | 10126670 A1 | 12/2002 |

(Continued)

OTHER PUBLICATIONS

Wagstaff, Jeremy, "A Passion for the Keys", The Wall Street Journal Online, Nov. 23, 2007, 3 pages, retrieved from the Internet at online.wsj.com/article_print/SB119578337324301744.html.

(Continued)

*Primary Examiner* — Carolyn R Edwards
*Assistant Examiner* — Jeffrey A Parker
(74) *Attorney, Agent, or Firm* — Ferguson Braswell Fraser Kubasta PC

(57) ABSTRACT

Described herein are techniques related to a touchpad with capacitive force sensing. The described techniques may determine the point or region of a user-engagement surface contacted by a user. In addition, the described techniques may also determine a force of the user's finger press on the user-engagement surface using one or more capacitance force-sensors. Furthermore, the described techniques may offer active tactile feedback (i.e., haptics) to the user's finger touching the user-engagement surface. This Abstract is submitted with the understanding that it will not be used to interpret or limit the scope or meaning of the claims.

16 Claims, 11 Drawing Sheets

(56) References Cited

U.S. PATENT DOCUMENTS

| | | |
|---|---|---|
| D278,239 S | 4/1985 | Felix et al. |
| D284,574 S | 7/1986 | Fischer |
| D292,801 S | 11/1987 | Davis, Jr. et al. |
| 4,786,766 A | 11/1988 | Kobayashi |
| 4,885,565 A | 12/1989 | Embach |
| D312,623 S | 12/1990 | Carter et al. |
| 5,121,091 A | 6/1992 | Fujiyama |
| 5,189,390 A | 2/1993 | Fagard |
| 5,212,473 A | 5/1993 | Louis |
| 5,239,152 A | 8/1993 | Caldwell et al. |
| 5,626,223 A | 5/1997 | Lee |
| 5,667,061 A | 9/1997 | Lee |
| 5,921,382 A | 7/1999 | Retter |
| 5,973,670 A | 10/1999 | Barber et al. |
| 5,977,867 A | 11/1999 | Blouin |
| 5,977,888 A | 11/1999 | Fujita et al. |
| 5,982,304 A | 11/1999 | Selker et al. |
| 6,039,258 A | 3/2000 | Durbin et al. |
| 6,067,081 A | 5/2000 | Hahlganss et al. |
| 6,118,435 A | 9/2000 | Fujita et al. |
| 6,218,966 B1 | 4/2001 | Goodwin et al. |
| 6,219,034 B1 | 4/2001 | Elbing et al. |
| 6,262,717 B1 | 7/2001 | Donohue et al. |
| 6,373,463 B1 | 4/2002 | Beeks |
| 6,392,515 B1 | 5/2002 | Van Zeeland et al. |
| 6,429,846 B2 | 8/2002 | Rosenberg et al. |
| 6,466,118 B1 | 10/2002 | Van Zeeland et al. |
| 6,542,058 B2 | 4/2003 | Van Zeeland |
| 6,677,843 B1 | 1/2004 | Monroe et al. |
| 6,693,626 B1 | 2/2004 | Rosenberg |
| 6,723,937 B2 | 4/2004 | Engelmann et al. |
| 6,819,990 B2 | 11/2004 | Ichinose |
| 6,822,635 B2 | 11/2004 | Shahoian et al. |
| 6,861,603 B1 | 3/2005 | Wang |
| 6,911,901 B2 | 6/2005 | Bown |
| 6,937,124 B1 | 8/2005 | Nakamura et al. |
| 6,982,617 B2 | 1/2006 | Brilon et al. |
| D527,004 S | 8/2006 | Yen |
| 7,106,305 B2 | 9/2006 | Rosenberg |
| 7,113,177 B2 | 9/2006 | Franzen |
| 7,119,798 B2 | 10/2006 | Yoshikawa et al. |
| 7,148,789 B2 | 12/2006 | Sadler et al. |
| 7,166,795 B2 | 1/2007 | Lengeling |
| 7,182,691 B1 | 2/2007 | Schena |
| 7,196,688 B2 | 3/2007 | Schena |
| 7,215,329 B2 | 5/2007 | Yoshikawa et al. |
| 7,227,537 B2 | 6/2007 | Nakayama et al. |
| 7,269,484 B2 | 9/2007 | Hein |
| 7,292,227 B2 | 11/2007 | Fukumoto et al. |
| 7,312,791 B2 | 12/2007 | Hoshino et al. |
| 7,324,094 B2 | 1/2008 | Moilanen et al. |
| 7,336,266 B2 | 2/2008 | Hayward et al. |
| 7,339,572 B2 | 3/2008 | Schena |
| 7,342,573 B2 | 3/2008 | Ryynaenen |
| 7,385,308 B2 | 6/2008 | Yerdon et al. |
| 7,400,319 B2 | 7/2008 | Nakayama et al. |
| 7,450,110 B2 | 11/2008 | Shahoian et al. |
| 7,525,415 B2 | 4/2009 | Yatsu et al. |
| 7,548,232 B2 | 6/2009 | Shahoian et al. |
| 7,567,232 B2 | 7/2009 | Rosenberg |
| 7,579,758 B2 | 8/2009 | Maruyama et al. |
| 7,589,607 B2 | 9/2009 | Rochon et al. |
| 7,592,901 B2 | 9/2009 | Furusho |
| 7,592,999 B2 | 9/2009 | Rosenberg et al. |
| 7,602,384 B2 | 10/2009 | Rosenberg et al. |
| 7,607,087 B2 | 10/2009 | Prados |
| 7,855,715 B1 | 12/2010 | Bowen |
| 7,868,515 B2 | 1/2011 | Krochmal et al. |
| 7,969,288 B2 | 6/2011 | Braun et al. |
| 7,982,720 B2 | 7/2011 | Rosenberg et al. |
| 8,031,181 B2 | 10/2011 | Rosenberg et al. |
| 8,059,105 B2 | 11/2011 | Rosenberg et al. |
| 2001/0002648 A1 | 6/2001 | Van Zeeland |
| 2002/0054060 A1 | 5/2002 | Schena |
| 2002/0084721 A1 | 7/2002 | Walczak |
| 2002/0149561 A1 | 10/2002 | Fukumoto et al. |
| 2002/0180710 A1 | 12/2002 | Roberts |
| 2003/0067449 A1 | 4/2003 | Yoshikawa et al. |
| 2003/0209131 A1 | 11/2003 | Asahi |
| 2004/0252104 A1 | 12/2004 | Nakamura et al. |
| 2005/0017947 A1 | 1/2005 | Shahoian et al. |
| 2005/0157893 A1 | 7/2005 | Pelrine et al. |
| 2005/0204906 A1 | 9/2005 | Lengeling |
| 2005/0237309 A1 | 10/2005 | Sharma |
| 2006/0109256 A1 | 5/2006 | Grant et al. |
| 2006/0113880 A1 | 6/2006 | Pei et al. |
| 2006/0256075 A1 | 11/2006 | Anastas et al. |
| 2006/0261983 A1 | 11/2006 | Griffin et al. |
| 2007/0031097 A1 | 2/2007 | Heikenfeld et al. |
| 2007/0080951 A1 | 4/2007 | Maruyama et al. |
| 2007/0091070 A1 | 4/2007 | Larsen et al. |
| 2007/0146317 A1 | 6/2007 | Schena |
| 2007/0146334 A1 | 6/2007 | Inokawa |
| 2007/0152974 A1 | 7/2007 | Kim et al. |
| 2007/0193436 A1 | 8/2007 | Chu |
| 2007/0229464 A1 | 10/2007 | Hotelling et al. |
| 2007/0234887 A1 | 10/2007 | Sawada et al. |
| 2007/0234890 A1 | 10/2007 | Yamashita |
| 2007/0236449 A1 | 10/2007 | Lacroix et al. |
| 2007/0236450 A1 | 10/2007 | Colgate et al. |
| 2008/0083314 A1 | 4/2008 | Hayashi et al. |
| 2008/0084384 A1 | 4/2008 | Gregorio et al. |
| 2008/0092720 A1 | 4/2008 | Yamashita et al. |
| 2008/0100568 A1 | 5/2008 | Koch et al. |
| 2008/0289952 A1 | 11/2008 | Pelrine et al. |
| 2008/0302647 A1 | 12/2008 | Villain et al. |
| 2008/0303782 A1 | 12/2008 | Grant et al. |
| 2008/0303797 A1* | 12/2008 | Grothe .......................... 345/173 |
| 2009/0002205 A1 | 1/2009 | Klinghult et al. |
| 2009/0046069 A1 | 2/2009 | Griffin et al. |
| 2009/0072662 A1 | 3/2009 | Sadler et al. |
| 2009/0128501 A1 | 5/2009 | Lazaridis et al. |
| 2009/0178913 A1 | 7/2009 | Peterson et al. |
| 2009/0189790 A1 | 7/2009 | Peterson et al. |
| 2009/0189873 A1 | 7/2009 | Peterson et al. |
| 2009/0210568 A1 | 8/2009 | Peterson et al. |
| 2009/0231277 A1 | 9/2009 | Peterson et al. |
| 2009/0231305 A1* | 9/2009 | Hotelling et al. ............. 345/174 |
| 2009/0243817 A1* | 10/2009 | Son .......................... 340/407.2 |
| 2009/0255793 A1 | 10/2009 | Krochmal et al. |
| 2010/0079379 A1* | 4/2010 | Demuynck et al. .......... 345/169 |
| 2010/0109486 A1 | 5/2010 | Polyakov et al. |
| 2010/0171715 A1 | 7/2010 | Peterson et al. |
| 2010/0231423 A1 | 9/2010 | Yang |
| 2010/0253645 A1* | 10/2010 | Bolender ...................... 345/174 |
| 2011/0096013 A1 | 4/2011 | Krumpelman et al. |
| 2011/0128239 A1 | 6/2011 | Polyakov et al. |
| 2011/0205165 A1* | 8/2011 | Pfau et al. .................... 345/173 |
| 2011/0227763 A1 | 9/2011 | Schlosser et al. |
| 2011/0227872 A1 | 9/2011 | Huska et al. |
| 2011/0234494 A1 | 9/2011 | Peterson et al. |
| 2012/0043191 A1 | 2/2012 | Kessler et al. |
| 2012/0092263 A1 | 4/2012 | Peterson et al. |
| 2012/0169603 A1 | 7/2012 | Peterson et al. |

FOREIGN PATENT DOCUMENTS

| | | |
|---|---|---|
| DE | 2005002417 A | 4/2005 |
| DE | 2004005501 A | 8/2005 |
| EP | 0278916 A | 8/1988 |
| EP | 1310860 A | 5/2003 |
| EP | 1548776 A | 6/2005 |
| JP | 2007173087 A | 7/2007 |
| JP | 2011233406 A | 11/2011 |
| WO | 0191100 A | 11/2001 |
| WO | 02073587 A | 9/2002 |
| WO | 2009043605 A | 4/2009 |
| WO | 2009067708 A1 | 5/2009 |
| WO | 2009097358 A | 8/2009 |
| WO | 2009097359 A | 8/2009 |

(56) References Cited

FOREIGN PATENT DOCUMENTS

| WO | 2009097361 A2 | 8/2009 |
|---|---|---|
| WO | 2009114827 A | 9/2009 |

OTHER PUBLICATIONS

Wing, Alan et al., "Multidimensional Haptics Preliminary Report", Retrieved from <http://www.touch-hapsys.org>, (Sep. 21, 2003),pp. 1-125.
Wu, Xingtao et al., "A Generalized Capacitance-Based Model for Electrostatic Micro-Actuators", Department of Physics, New Jersey Institute of Technology, Newark, NJ, 07102-1982 Department of Mechanical Engineering, Columbia University, NY 10027, pp. 1-23.
Yang, Gi-Hun, "Novel Haptic Mouse System for Holistic Haptic Display and Potential of Vibrotactile Stimulation", Human-Robot Interaction Research Center, Korea Advanced Institute of Science and Technology, 2005, 17 pages.
Zou, Jun et al., "Design of a Wide Turning Range Micromachined Turnable Capacitor for Wireless Communications", First IEEE Electro/Information Technology Conference, Jun. 8-11, Chicago, IL, 2000, 6 pages.
Bifano, Thomas, "Parallel Plate Electrostatic Actuation for High-Resolution Deformable Mirrors", Boston University, Boston, MA, Aug. 19, 2004.
Fukumoto, Masaki, et al, "Active Click: Tactile Feedback for Touch Panels", NTT DoCoMo Multimedia Labs, Mar. 31, 2001, 2 pages.
Mackenzie, Scott, et al, "The Tactile Touchpad", 1997, 5 pages.
Mackenzie, Scott, et al., "A Comparison of Three Selection Techniques for Touchpads", Proceedings of the CHI'98 Conference on Human Factors in Computing Systems, pp. 336-343 New York 1998.
Oniszczak, Aleks, "VersaPad Driver Plus Pack", 1999, 3 pages.
Poupyrev, Ivan, et al., "Tactile Interfaces for Small Touch Screens", 2003, 4 pages.
Poupyrev, Ivan, et al., "TouchEngine: A Tactile Display for Handheld Devices", 2002, 2 pages.
"Non-Final Office Action dated May 14, 2012", U.S. Appl. No. 13/323,292, 19 pages.
"Final Office Action dated Aug. 1, 2012", U.S. Appl. No. 12/580,002, 23 pages.
"Elastomers: Powerful Polymer", Retrieved from <http://appliancedesign.com/copyright/>, (Jun. 2006),5 pages.
"Haptic Touch Technology", Pacinian,(Nov. 2007),2 pages.
"Haptics: Learning Through Touch", Retrieved from <http://ced.ncsu.edu/nanoscale/haptics.htm>, (2004),5 pages.
"International Search Report and Written Opinion", Application No. PCT/US2010/020380, (dated Apr. 12, 2010),10 pages.
"Nanoactuators Based on Electrostatic Forces on Dielectrics", Retrieved from <http://www.nasatech.com/Briefs/Apr05/NPO30747.html>on Nov. 28, 2005, NASA's Jet Propulsion Laboratory, Pasadena, CA,4 pages.
"New SRI International sSpin-Off, Artificial Muscle, Inc., Secure Series a Funding from Leading VC Firms", Retrieved from <http://www.sri.com/news/releases/05-03-04.html> on Jan. 30, 2008, SRI International Spin Offs Artificial Muscle, Inc,(May 2004),2 pages.
"Non-Final Office Action dated Dec. 9, 2011", U.S. Appl. No. 12/580,002, 21 pages.
"Tactile Perception and Design", Retrieved from http://www.tireesias.org/reports.tpd2.htm on Apr. 4, 2006, 10 pages.
"Touch and Haptics", 2004 IEEE/ RSJ International Conference on Intelligent Robots and Systems, (Sep. 28, 2004),32 pages.
Ashley, Steven "Artificial Muscles", Scientific American, Available at <www.sciam.com>,(Oct. 2003),pp. 53-59.
Bar-Cohen, Y. "Electroactive Polymer (EAP) Actuators as Artificial Muscles—Reality, Potential and Challenges", SPIE Press, (Mar. 18, 2004),pp. 26 and 548-550.
Bar-Cohen, Yoseph "Electric Flex", IEEE Spectrum Online, (Jun. 2004),6 pages.

Bar-Cohen, Yoseph "Electroactive Polymers as Artificial Muscles—Capabilities, Potentials and Challenges", Robotics 2000, Available at <www.spaceandrobotics>,(Feb. 28-Mar. 2, 2000),pp. 1-8.
Bar-Cohen, Yoseph "Electroactive Polymers", Retrieved from <http://electrochem.cwru.edu/ed/encycl/>, Electrochemistry Encyclopedia,(Dec. 2004),7 pages.
Bar-Cohen, Yoseph "Low Mass Muscle Actuators (LoMMAs)", Telerobotic Task Sponsored by NASA HQ, Code S, (Oct. 23, 1997),18 pages.
Bar-Cohen, Yoseph "Worldwide Electroactive Polymers", (Artificial Muscles) Newsletter, vol. 7, No. 2, Available at <http://eap.jpl.nasa.gov>,(Dec. 2005),pp. 1-16.
Bark, Karlin "Functional Prototype I", Retrieved from <http://bdml.stanford.edu/twiki/bin/view/Haptics/FunctionalPrototypeI?—skin=print.pattern>, (Aug. 9, 2005),3 pages.
Bifano, Thomas "Parallel Plate Electrostatic Actuation for High-Resolution Deformable Mirrors", Boston University, (Aug. 19, 2004),35 pages.
Biggs, James "Some Useful Information for Tactile Display Design", IEEE Transactions on Man-Machine Systems, vol. 11, No. 1,(1970),pp. 19-24.
Carpi, Federico et al., "Dielectric Elastomers as Electromechanical Transducers: Fundamentals, Materials, Devices, Models and Applications of an Emerging Elecrotactive Polymer Technology", Elsevier Ltd., (2008),12 pages.
Fontaine, Ebraheem "A Laboratory Demonstration of a Parallel Robotic Mechanism", Massachusetts Institute of Technology,(Jun. 2002),pp. 1-14.
Gorinevsky, Dimitry "Adaptive membrane for large lightweight space telescopes", SPIE Astronomical Telescopes and Instrumentation,(2002),pp. 1-9.
Hayward, Vincent et al., "Tactile Display Device Using Distributed Lateral Skin Stretch", Proceedings of the Haptic Interfaces for Virtual Environment and Teleoperator Systems Symposium, ASME International Mechanical Engineering Congress & Exposition,(2000),pp. 1309-1314.
Hollis, Ralph "Haptics", Berkshire Encyclopedia of Human-Computer Interaction, Berkshire Publishing Group,(2004), pp. 311-316.
Jager, Edwin et al., "Microfabricating Conjugated Polymer Actuators", Science Magazine, vol. 290, www.sciencemag.org,(Nov. 24, 2000),pp. 1540-1544.
Jungmann, M., et al, Miniaturised Electrostatic Tactile Display with High Structural Compliance, 2002, 6 pages.
Non-Final Office Action dated Feb. 13, 2009, U.S. Appl. No. 11/945,879.
O'Halloran, A et al., "Materials and Technologies for Artificial Muscle: A Review for the Mechatronic Muscle Project", Topics in Bio-Mechanical Engineering, Chapter 7, Department of Electronic Engineering, National University of Ireland Galway,(2004),pp. 184-215.
Pasquero, Jerome "Stress: A Tactile Display Using Lateral Skin Stretch", Department of Electrical and Computer Engineering McGill University, Montreal,(Oct. 2003),75 pages.
Pasquero, Jerome "Survey on Communication Through Touch", Technical Report: TR-CIM 06.04, Center for Intelligent Machines Department of Electrical and Computer Engineering,(Jul. 2006),pp. 1-27.
Pei, Qibing et al., "Multiple-Degrees-of-Freedom Electroelastomer Roll Actuators", SRI International Institute of Physics Publishing, (2004),pp. N86-N92.
Raisamo, Roope "Tactile User Interfaces", New Interaction Techniques,(Aug. 2, 2001),30 pages.
Seeger, Joseph et al., "Dynamics and Control of Parallel-Plate Actuators Beyond the Electrostatic Instability", Transducers "99 The 10th International Conference on Solid State Sensors and Actuators, (Jun. 1999),pp. 474-477.
Spires, Shelby "Artificial Strongman", Smart Business: For The New Economy, (Nov. 2000),1 page.
Srinivasan, Mandayam A., et al, "Role of Skin Biomechanics in Mechanoreceptor Response", Retrieved from <http://touchlab.mit.edu/oldresearch/currentwork/humanhaptics/roleofsk- inbiomechanics/> on Dec. 20, 2007, MIT Touch Lab, (Dec. 20, 2007),pp. 1-13.

(56) References Cited

OTHER PUBLICATIONS

Supplemental Notice of Allowance dated May 20, 2010, U.S. Appl. No. 11/945,879, 5 pages.
United States Patent and Trademark Office, US Non-final Office Action for U.S. Appl. No. 12/975,733 dated Oct. 25, 2013.
USPTO, Final Office Action in U.S. Appl. No. 13/606,005, dated Apr. 1, 2013.
USPTO, Response to Final Office Action in U.S. Appl. No. 13/606,005, dated May 22, 2013.
USPTO, Non-Final Office Action in U.S. Appl. No. 13/606,005, dated Nov. 16, 2012.
USPTO, Response to Non-Final Office Action in U.S. Appl. No. 13/606,005, dated Feb. 15, 2013.
USPTO, Non-Final Office Action in U.S. Appl. No. 13/606,005, dated Oct. 17, 2013.
USPTO, Response to Non-Final Office Action in U.S. Appl. No. 13/606,005, dated Jan. 7, 2014.
USPTO, Final Office Action in U.S. Appl. No. 13/606,005, dated Jun. 9, 2014.
Wingert, A. et al., "On the Kinematics of Parallel Mechanisms with Bi-Stable Polymer Actuators"; Advances in Robot Kinematics pp. 303-310, Jan. 2002, (8 pages).
"Proposed Experiment Protocal and Details"; Retrieved from http://www.bdml.stanford.edu/twiki/bin/view/Haptics/ProposedExperimentProtocalandDetails, Feb. 2006 (5 pages).
"Towards a Touching Presence: TOUCH-HAPSYS High Definition Haptic Systems"; Retrieved from http://www.touch-hapsyss.org, Jun. 2006 (2 pages).
Bar-Cohen, Y. et al., "Enabling Novel Planetary and Terrestrial Mechanisms Using Electroactive Materials at the JPL's NDEAA Lab"; 2004 International Conference on NEMS, NANO, and Smart Systems (ICMENS 2004) Banff, Canada, Aug. 2004; http://trs.jpl.nasa.gov (10 pages).
Beavers, Jr., A. N.; "Basic Concepts for Commercial Applications of Electroactive Polymer Artificial Muscle", Artificial Muscle Incorporated, Menlo Park, California 94025, USA, Jul. 2009 (10 pages).
Bicchi, A. et al., "Haptic Illusions Induced by Tactile Flow", EuroHaptics Conference, Jul. 2003 (12 pages).
Jones, M. G. et al., "A Comparison of Learning with Haptic and Visual Modalities", The electronic journal of haptics research, vol. 3, No. 6, May 3, 2005 (20 pages).
Jones, Lynette, "Human Factors and Haptic Interfaces", Department of Mechanical Engineering, Massachusetts Institute of Technology, Jun. 2001 (40 pages).
Kajimoto, H. et al., "Electro-Tactile Display with Tactile Primary Color Approach", Journal, Graduate School of Information Science and Technology, University of Tokyo, Tokyo Japan, Oct. 2004 (10 pages).
Ha, S. M. et al., "Interpenetrating Polymer Networks for High-Performance Electroelastomer Artificial Muscles", Published in Advanced Materials, vol. 18, Issue 7, Apr. 2006 (19 pages).
Odell, D.L. et al., "MicroRobot Conveyance and Propulsion System Using Comb Drive and Parallel Plate Actuators: The ScuttleBot" May 2010 (4 pages).
Pasquero, J., "Stimulation of the Fingertip by Lateral Skin Stretch", Center for Intelligent Machines, McGill University, Canada, May 2005 (5 pages).
Pasquero, J., "Tactile Display Survey", Technical Report, Center for Intelligent Machines, McGill University, Canada, May 2010 (6 pages).
Sommer-Larsen, Peter, "Artificial Muscles", Riso National Laboratory, Condensed Matter Physics and Chemistry Department, Dec. 2001 (3 pages).
Wagner, C.R. et al., "Integrating Tactile and Force Feedback with Finite Element Models", Proceedings of the 2005 International Conference on Robotics and Automation, Barcelona, Spain, Apr. 2005 (6 pages).

\* cited by examiner (background)

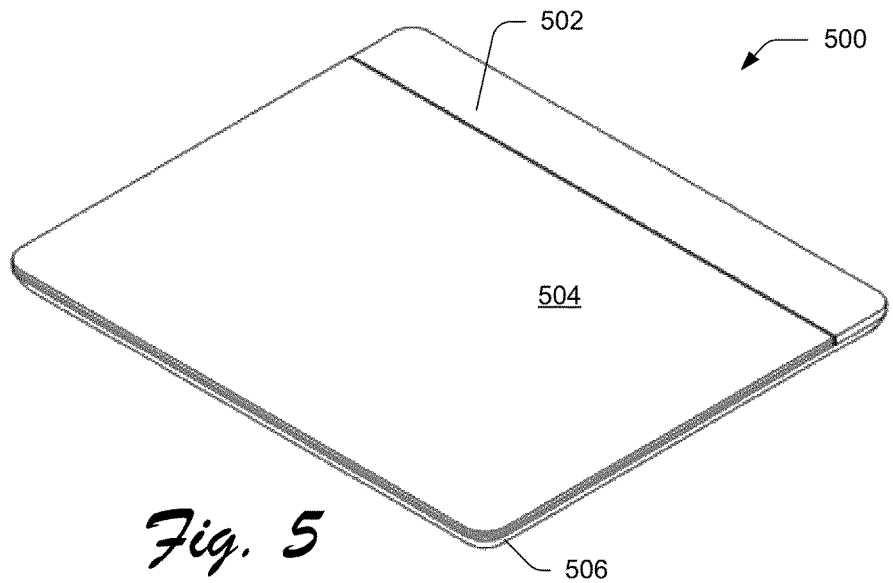
Fig. 5
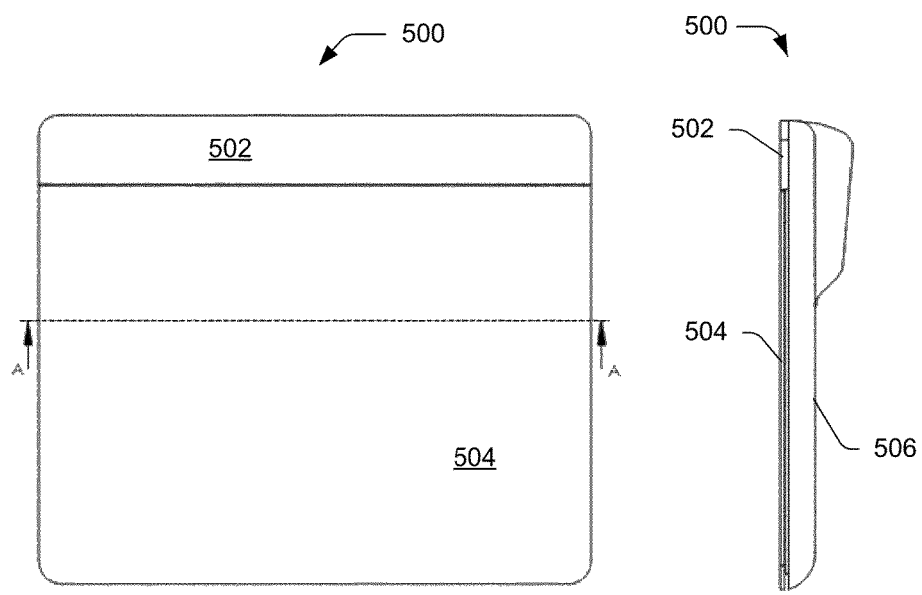
Fig. 6
Fig. 7

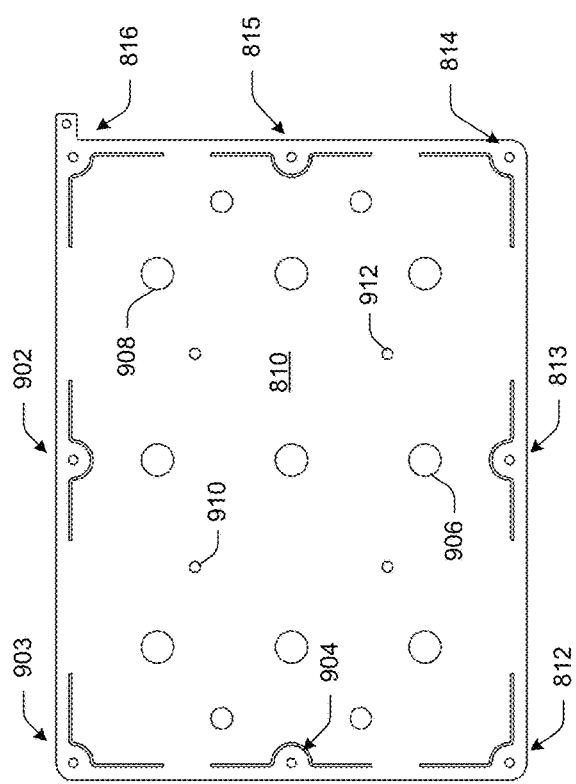
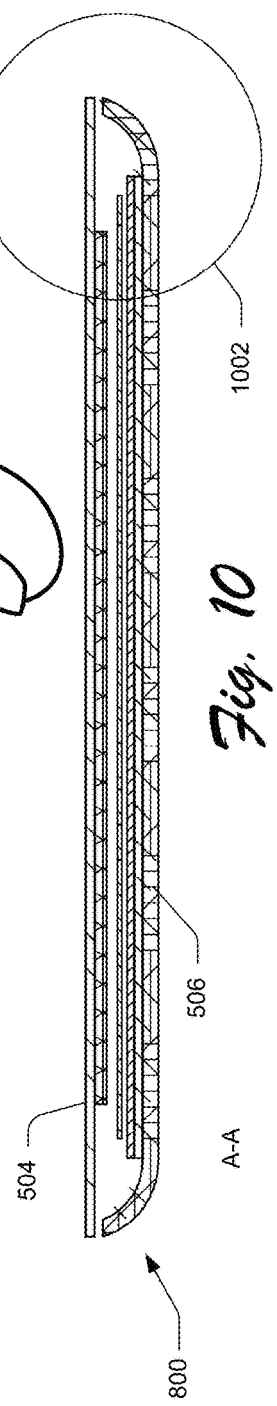

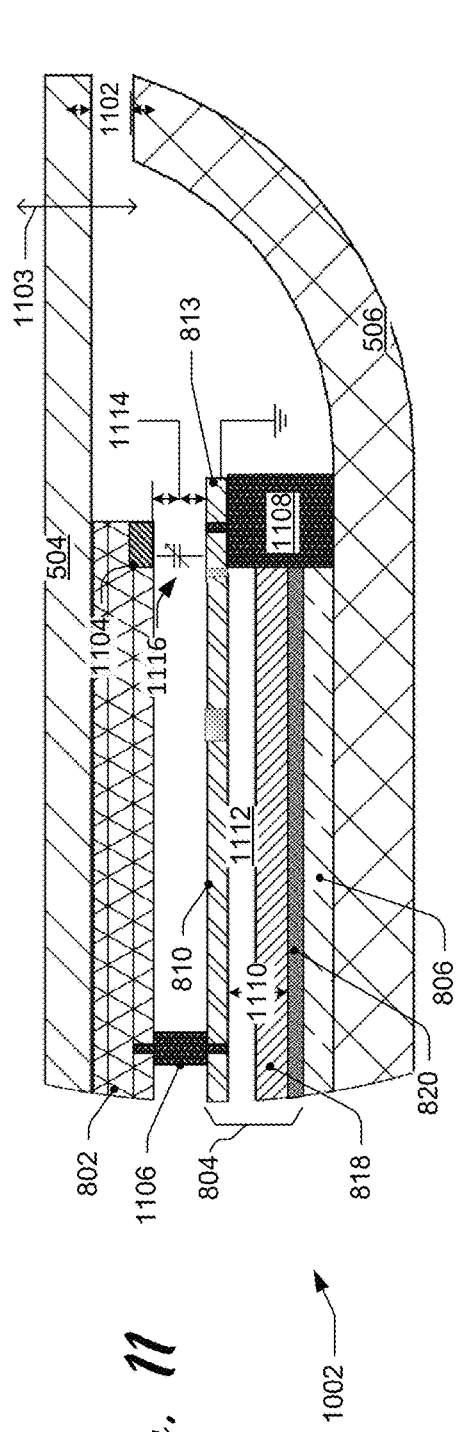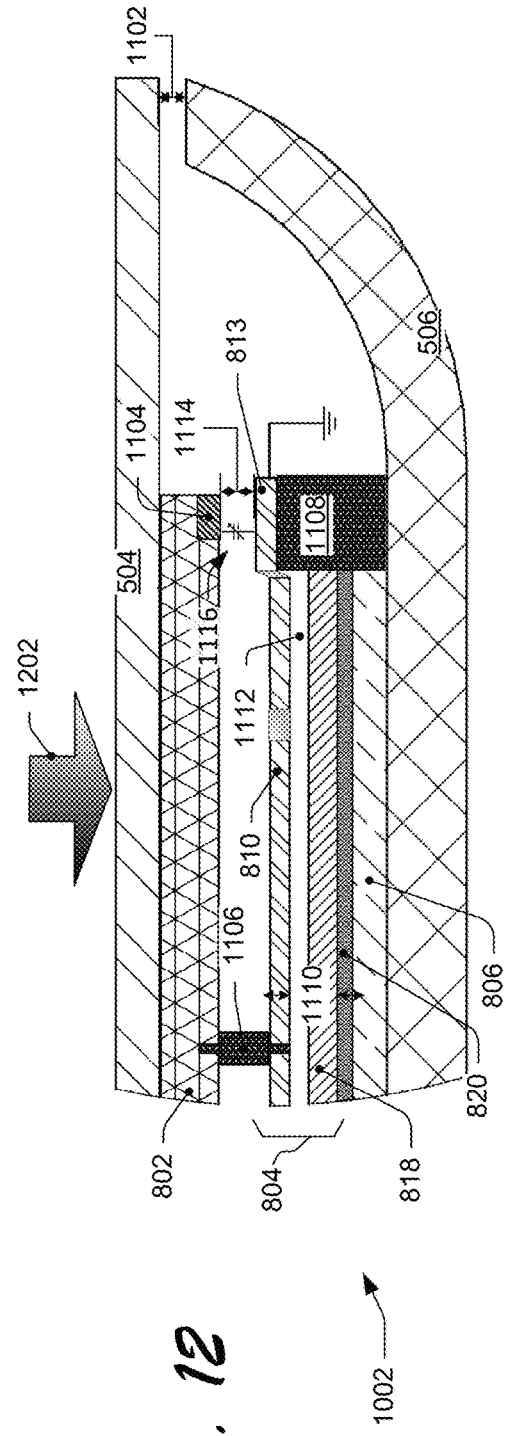

TOUCHPAD WITH CAPACITIVE FORCE SENSING

RELATED APPLICATION

This application is related to and claims the benefit of priority to U.S. Provisional Application Ser. No. 61/347,768, filed on May 24, 2010, the disclosure of which is incorporated by reference herein.

BACKGROUND

Touchpads seemingly are the de facto industry-standard pointing device built into portable computing devices (e.g., laptops, netbooks, notebooks, etc.). Typically, a touchpad (i.e., trackpad) has a small, flat, touch-sensitive surface area that senses the position of a user's finger (or fingers) on its surface to provide on-screen navigation, cursor movement, application control, and/or other user-interactive input to a computing device. Conventionally, touchpads work by sensing the changes in an electrical field using, for example, capacitance or conductance (i.e., resistance).

Capacitive touchpads (e.g., projected or surface capacitive) primarily detect location on the two-dimensional surface of the touchpad of the user's touch. This location may be called the "X/Y position" herein. Due to the nature of the technology, sensor designs, and environmental conditions, the "touch threshold" can vary quite widely.

FIG. 1 illustrates a conventional touchpad scenario 100, which shows a user's finger 102 hovering over a cross-section of a user-interactive portion 104 of a conventional touchpad. This portion 104 includes a touchsurface 106 and a conventional capacitive touch sensor 108. A region of varying capacitance (i.e., "circuit") 110 lies between the finger 102 and the capacitive touch sensor 108. Typically, the finger 102 is determined to have "touched" the touchsurface 106 when the capacitance of the circuit 110 exceeds a given threshold, as measured by the sensor 108.

The capacitive sensor 108 is generally designed to detect the user touching the touchsurface 106, but, depending on the size, skin humidity, and physiological factors of a user's finger and/or environmental conditions, the point at which the touch is detected can vary widely as the capacitance circuit 110 varies. Indeed, a projected-capacitance touchpad may "detect" a touch before a user has actually touched the touchpad.

In general, a touchpad is often used much like a mouse of a computer. For example, a mouse typically has one or more buttons to indicate performance of a function (i.e., action) associated with a cursor position. Such functions are called cursor-position associative functions and examples of such include (but are not limited to): menu pull down and selection, icon selection and use, program execution, properties access, and the like. Most mouse users are familiar with single-click, double-click, and right-click, and the corresponding action expected based upon the cursor location on the screen.

Many conventional touchpads are equipped with similar buttons to accomplish the same cursor-position associative functions. Instead of, or in addition to, buttons, some touchpads allow the user to indicate the performance of cursor-position associative functions based upon an action or gesture performed on the touchpad itself. For example, a user may indicate a "single-click" once the cursor has arrived at its desired spot by quickly tapping the touchpad. A "double-click" may be accomplished likewise with a double tap. Alternatively, a single or multi-finger gesture may accomplish a similar "mouse click."

All of the existing capacitive touchpad approaches offer an awkward or non-intuitive action for a user to select the performance of cursor-position associative functions. Examples of such awkward or non-intuitive actions include clicking a button with a different hand than the one touching the touchpad, clicking a button with a different finger on the same hand as the touchpad, tapping the touchpad, and touching the touchpad with a defined single- or multi-finger gesture.

SUMMARY

Described herein are techniques related to a touchpad with capacitive force sensing. The described techniques may determine the point or region of a user-engagement surface contacted by a user. In addition, the described techniques may also determine a force of the user's finger press on the user-engagement surface using one or more capacitive force-sensors. Furthermore, the described techniques may offer active tactile feedback (i.e., haptics) to the user's finger touching the user-engagement surface. Such feedback may be provided to enhance the illusion of pressing a displayed button on an on-screen user-interface (UI) of a computer display.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5-7 are three different views of a fourth implementation of a capacitive force-sensing touchpad configured to implement the techniques described herein. FIG. 5 is an isometric view of the fourth implementation of the capacitive force-sensing touchpad. FIG. 6 is top plan view of the fourth implementation of the touchpad. FIG. 7 is a side elevation view of the fourth implementation of the touchpad.

FIG. 9 is a top plan view of a spring plate of the fourth implementation of the capacitive force-sensing touchpad.

FIG. 10 is a cross-sectional side elevation view of the fourth implementation of the capacitive force-sensing touchpad.

FIGS. 11 and 12 are cross-sectional side elevation views of a cutaway of the fourth implementation of the capacitive force-sensing touchpad.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
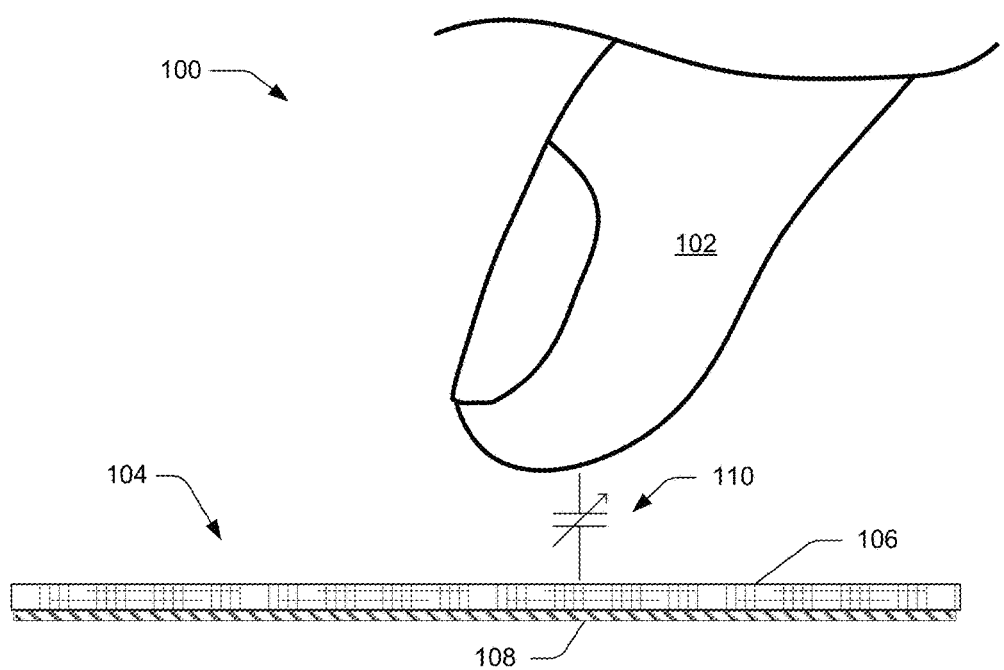
FIG. 1 is elevation view that illustrates a conventional touchpad scenario with a conventional capacitive touch sensor.

Described herein are techniques related to a touchpad with capacitive force sensing. As described herein, one or more of the exemplary force-sensing touchpads offer new approaches in determining the X/Y position of a user's finger touching the touchsurface of the touchpad. These new approaches include a determination of the X/Y position of the user's finger touch on the touchsurface by using one or more capacitive force-sensors. In addition, these new approaches also determine the force of the user's finger press on the touchsurface using one or more capacitive force-sensors. The force of the finger press moves the touchsurface in a "Z" direction (e.g., down) and thus the determination of that force equates to a detection of the "Z position" of the user's finger. Therefore, collectively, the new approaches described herein determine the X/Y/Z position of user's finger on the touchsurface of the exemplary force-sensing touchpad.

Furthermore, the described exemplary force-sensing touchpad may offer active tactile feedback (i.e., haptics) to the user's finger touching the touchsurface of the touchpad. Such feedback may be provided to enhance the illusion of pressing a displayed button on an on-screen user-interface (UI) of a computer display.

For example, consider a user moving an on-screen cursor over a selectable button using one of the exemplary force-sensing touchpads that is described herein. As the user rolls over and off of the on-screen selectable button, the haptics of the touchpad may provide feedback so that it feels, to the user, as if she can feel the edges of the on-screen button.

In this scenario with the on-screen cursor over the button, the user presses the surface a bit harder with the intention to select that on-screen button. She does this without lifting her finger from the touchsurface of the touchpad. In response to the harder press, the host computer (that the touchpad is attached thereto) determines that the user has selected the on-screen selectable button. In response to that, the touchpad provides active tactile feedback to the user. In this way, the user gets a satisfying tactile feedback of button press via the touchsurface of the touchpad.

With this and other similar scenarios, the exemplary force-sensing touchpad does not need extra buttons for the user to perform a single-, double-, or right-click operations of a conventional mouse or touchpad. Similarly, the user does not need to perform some of the conventional awkward gestures or movements to perform such operations.

Unless the context indicates otherwise, the terms "touchpad" or "trackpad" as used herein refers to one or embodiments of the new force-sensing techniques described herein. The embodiments of such embodiments may be referred to as an "exemplary force-sensing touchpad" or just "exemplary touchpad." While one or more example embodiments are described herein, the reader should understand that the claimed invention may be practiced using different details than the exemplary ones described herein.

Exemplary Force-Sensing Touchpads

Figure 2:
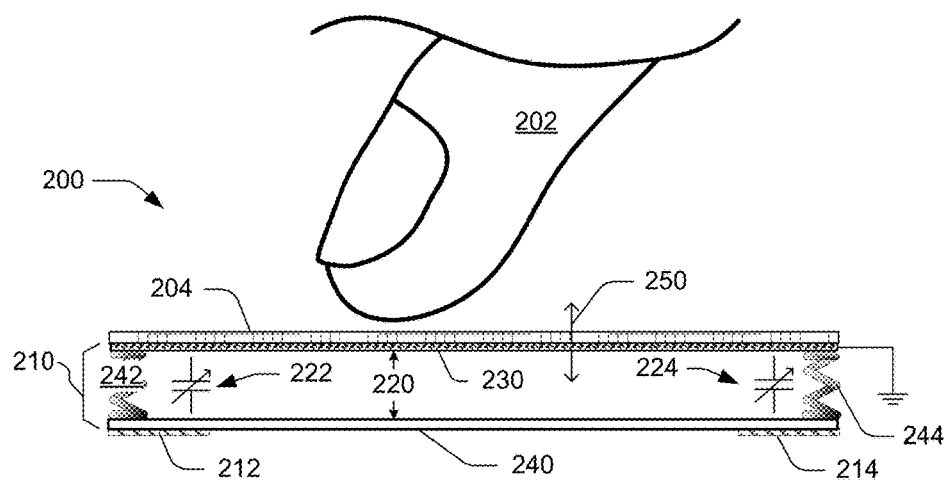
FIG. 2 is an elevation view that illustrates a first implementation of a capacitive force-sensing touchpad configured in accordance with the techniques described herein.
Figure 3:
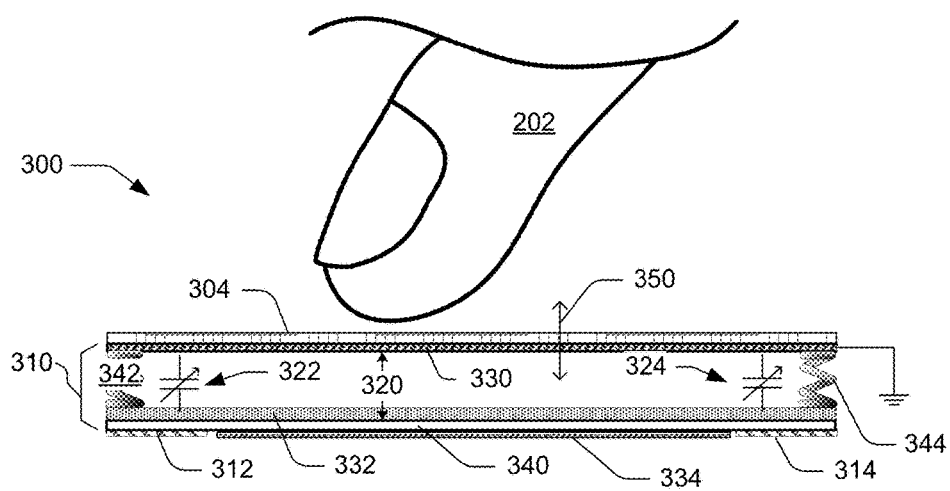
FIG. 3 is an elevation view that illustrates a second implementation of a capacitive force-sensing touchpad configured in accordance with the techniques described herein.
Figure 4:
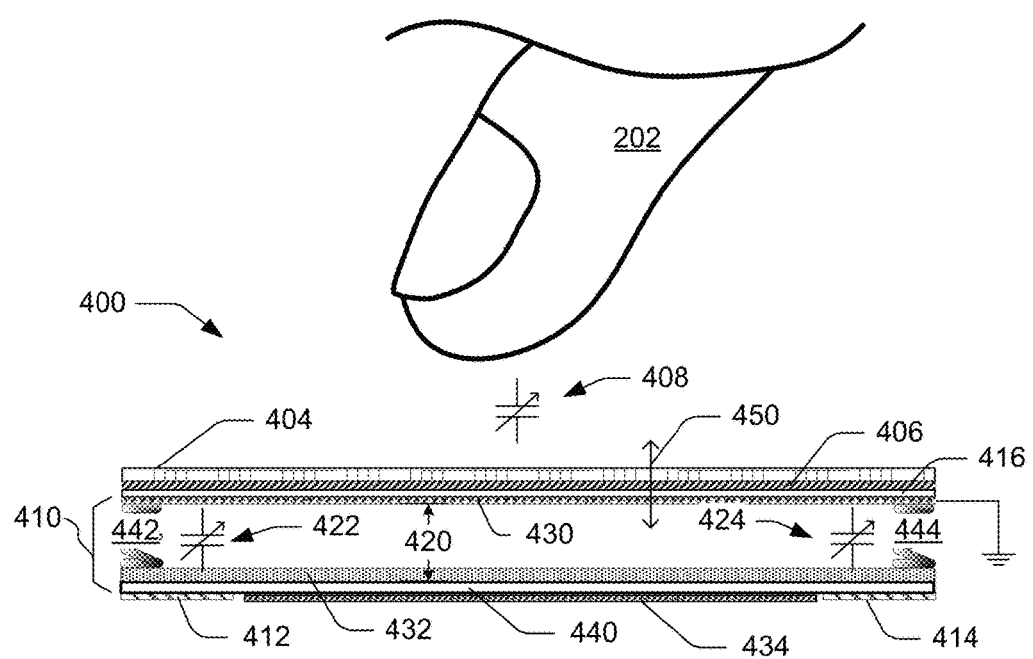
FIG. 4 is an elevation view that illustrates a third implementation of a capacitive force-sensing touchpad configured in accordance with the techniques described herein.

FIGS. 2-4 illustrate three different exemplary force-sensing touchpads. Each exemplary touchpad is configured to implement the techniques described herein to detect X/Y/Z finger position and/or provide active tactile ("haptics") user feedback to the finger. It is to be appreciated and understood that capacitive force sensing can be used alone and independent of any haptic actuator without departing from the spirit and scope of claimed subject matter. Moreover, it should also be appreciated that capacitive force sensing can be used with a haptic actuators described herein or, indeed, any type of haptic actuator without departing from the spirit and scope of claimed subject matter.

FIG. 2 shows a cross-section of a simplified exemplary force-sensing touchpad 200 that is configured to detect X/Y/Z finger position using the techniques described herein. The touchpad 200 is configured to detect X/Y finger position using the new techniques described herein and not via conventional approaches. The touchpad 200 is not configured to provide haptics.

The exemplary force-sensing touchpad 200 includes a touchsurface 204, a resistance mechanism 210, and multiple capacitive sensors (as represented by capacitive strips 212, 214 in FIG. 2). For context, FIG. 2 shows the user's finger 202 hovering over the touchsurface 204 in anticipation of touching the touchsurface. Herein, the touchsurface 204 may also be described as a user-engagement surface presented for contact by the user.

The resistance mechanism 210 holds at least a pair of resistance planes in a spaced-apart position relative to each other with a defined resistance gap 220 therebetween. As depicted, that pair includes an upper resistance plane 230 and a lower resistance plane 240. The upper resistance plane 230 is conductive and grounded. The resistance mechanism 210 also includes a return mechanism (as represented by springs 242 and 244 in FIG. 2) that aids in holding the resistance planes apart and also returns the planes back to their original position after they are forced together by the user pressing down on the touchsurface 204. One or more force-sensing capacitive "circuits" (e.g., 222 224) are located under the touchsurface 204.

As discussed in the background and shown in FIG. 1, traditional capacitive touch sensing involves detecting a change in capacitance between a capacitive touch sensor and a user's finger. In the traditional setting, the sensor 108 (as shown in FIG. 1) detects the changes in the capacitive circuit 110 created by the user's finger 102. Since the traditional circuit 110 is outside of the device and above the touchsurface 106, the circuit is variable and unpredictable because of size, skin humidity, and physiological factors of a user's finger and/or environmental conditions. This variability makes detection of precise changes in touch difficult, because the circuit must discern what relative changes in capacitance constitute a touch rather than just environmental influences.

Unlike the traditional capacitive touch sensing approach (as shown in FIG. 1), the capacitive circuits 222 and 224 of the exemplary touchpad 200 are located under the touchsurface 204. This arrangement significantly ameliorates or eliminates variations due to unpredictable external factors. Unlike the conventional approaches (as shown in FIG. 1), the user does not act as the ground with the exemplary touchpad 200.

Instead, the exemplary touchpad 200 has a conductive and grounded layer (i.e., "ground plane") placed above the capacitive sensors to act as the other half of the capacitive circuit. In the exemplary touchpad 200, the capacitive circuit 222 is located between the upper resistance plane 230 and the capacitive strip 212. Similarly, the capacitive circuit 224 is located between the upper resistance plane 230 and the capacitive strip 214.

The return mechanism of the resistance mechanism 210 resists movement in at least one direction of Z (e.g., down) of the touchsurface 204. The directions of Z are represented by vector arrow 250. The user's finger 202 pressing down on the touchsurface 204 typically causes such movement. As its name suggests, the return mechanism also urges the touchsurface 204 back to its original position after the user releases the press-down force.

The capacitive sensors (e.g., 212, 214), the ground plane (e.g., upper resistance plane 230), and the space therebetween create a capacitor as represented by the capacitive circuits (such as 222, 224). Consequently, a capacitive sensor and at least a portion of the upper resistance plane 230 form a first and second plane (e.g., plate) of a capacitor and thus form a capacitive circuit (e.g., 222) therebetween.

When the touchsurface 204 is touched or pressed, the force of the touch causes the top layer to move down a distance determined by the overall resistance rate of the resistance mechanism. The spring rate of the springs 242 and 244 is part of the overall resistance rate. The movement caused by the press-down force changes the size of the gap 220 between the sensors (e.g., 212, 214) and the ground plane (e.g., 230), resulting in a changing capacitance (e.g., of circuits 222 and/or 224) that can be measured with a capacitive sensor.

The exemplary touchpad 200 has a sensor topology configured so one or more sensors can also be used to detect X/Y positions as well as Z-position. In the basic case, the capacitive sensor can be a single sensor that is spatially distributed around the edges or corners. In this case, the capacitive sensor can be broken up into one or more sensor regions, such as in each corner of a rectangular surface, and each sensor is read independently. Then, the force of each sensor can be combined in an algorithm that can determine the centroid of the force. Such an algorithm uses a form of interpolation to find the centroid of force. Using a minimum of three points, this interpolation may be a form of triangulation. Since the touchsurface of a touchpad is typically a rectangle, at least one implementation employs a form of interpolation that uses four data points (e.g., force-sensed input), which may be called "quadrangulation." Those of ordinary skill in the art know the specific equations used in such a calculation. In the fields of Statics in the mechanical engineering discipline, these equations may be those used for expressing or determining the equilibrium of a rigid body in two-dimensions.

For example, if a user touches exactly in the middle of a touchsurface, each force sensor will have approximately the same reading, but if the user is closer to one corner, that corner will read higher force. Calibration of the touch position, like in most traditional touch sensors, can be done to factor out sensor location variance from unit to unit. Summation of the force from all of the sensor locations results in a similar total force measurement as the basic implementation of this technology.

The exemplary touchpad 200 may determine the X/Y position of the user's finger based upon the change of capacitance of multiple capacitive circuits (like capacitive circuits 222 and 224) between each of the multiple capacitive sensors (like sensors 212 and 214). The capacitive sensors are spatially distributed under the touchsurface 204. Based upon the known locations of the sensors and the measured capacitance of the capacitive circuits (e.g., 222 and 224), the X/Y position of the finger may be determined by forms of interpolation (e.g., quadrangulation).

Unlike the traditional capacitive touch sensors, the capacitive circuits 222 and 224 change in a predictable manner every time the touchsurface 204 moves. The capacitance of the sensors, when correlated to the known resistance rate, directly relates to the force that the user applies to the touchsurface 204. Furthermore, when the capacitive sensors are equally distributed under the touchsurface (e.g., on the edge or in the corners of the lower resistance plane 240), the force can be sensed accurately regardless of where the force is applied. Typically, the larger the sensor locations are, the higher the sensing accuracy can be, and more precise and balanced resistance rates can improve sensing, as well. In at least some embodiments, multiple sensors or sensor regions can be used to determine one or more force inputs at different locations of the touchsurface 204.

Automatic and/or manual calibration between the capacitance and the resistance to movement of the resistance mechanism can be done to ensure the user has a consistent input experience regardless of orientation or manufacturing tolerances. For example, automatic calibration can be basic, as in resetting the force sensors to zero on start up, or advanced, as in using an accelerometer to determine operating angle and compensating for the gravity effects of the touchsurface at that angle.

FIG. 3 shows a cross-section of a simplified exemplary force-sensing touchpad 300 that is configured to both detect X/Y/Z finger position and provide haptics using the techniques described herein. The exemplary force-sensing touchpad 300 includes a touchsurface 304, an actuation mechanism 310, and multiple capacitive sensors (as represented by capacitive strips 312, 314 in FIG. 3). For context, FIG. 3 shows the user's finger 202 hovering over the touchsurface 304 in anticipation of touching the touchsurface.

Like that resistance mechanism 210 of the touchpad 200, the actuation mechanism 310 of the touchpad 300 holds at least a pair of planes in a spaced-apart position relative to each other with a defined gap therebetween. That gap is called the defined actuation gap 320 herein. As depicted, the pair of planes includes an upper actuation plane 330 and a lower actuation plane 340. A dielectric layer 332 is located between the planes and a conductive layer 334 is attached to the underside of the lower actuation plane 340. As shown here, the upper actuation plane 330 is conductive and grounded.

The actuation mechanism 310 includes a return mechanism (as represented by springs 342 and 344 in FIG. 3) that aids in holding the actuation planes apart and also returns the planes back to their original position after they are forced together by the user pressing down on the touchsurface 304 and after an actuation.

One or more force-sensing capacitive "circuits" (such as 322 and 324) is located under the touchsurface 304. In other words, one or more capacitors are formed between the upper actuation plane 330 and each of the capacitive sensors (e.g., capacitive strips 312, 314) below the lower actuation plane 340. In this way, the upper actuation plane 330 and the capacitive sensors form the capacitor planes (e.g., first and second planes) of one or more capacitors.

In addition to performing capacitive force-sensing touch detection like the exemplary touchpad 200, the exemplary touchpad 300 also performs active tactile feedback to the user touching the touchsurface 304. Many of the same components used to detect capacitive force-sensing touch may also be used to perform the actuation for the tactile feedback. Of course, in alternative implementations, different and separate components may perform each of the capacitive force-sensing touch detection and the actuation for the tactile feedback.

With the capacitive sensors (e.g., 312, 314) on the edges of the lower plane (e.g., lower actuation plane 340), the conductive layer 334 can occupy the center of that lower plane and be utilized as a high voltage electrode of an electrostatic actuation subsystem. In at least some embodiments, either conductive layer may be a film or layer of particles applied to a substrate, such as indium tin oxide (ITO). The ground layer of the upper surface can act as the ground in the electrostatic actuation.

Force-measuring capacitive touch technology can be implemented to provide tactile feedback to simulate any number of tactile responses. For example, in at least some embodiments like that shown in FIG. 3, a capacitive force detection sensor can be operably associated with a haptic actuator to provide haptic feedback. In some cases, capacitive force detection can be implemented to trigger one or more tactile responses based on one or more force thresholds. For example, when typing on an on-screen keyboard, snap-over may be simulated by triggering a haptic response when a "press" force threshold (such as sixty grams) is exceeded. Alternately or additionally, in at least some embodiments, another haptic response may be triggered when a "release" force threshold (such as forty grams) is traversed. Further, in at least some embodiments, configuring a capacitive force sensor with a hysteresis of one or more thresholds for triggering haptic response can result in haptic feedback profiles suitable for key snap-over and button/switch position clicks. For example, a haptic actuator operably coupled to a capacitive force sensor may be implemented to provide a tactile feedback profile similar to a traditional keyboard dome snap over (e.g., break force, return force).

In at least some embodiments, force measuring capacitive technology may be implemented in part by a microcontroller capable of executing processor-executable instructions stored on processor-readable storage media. In at least some embodiments, the microcontroller is operably coupled to at least a capacitive sensor or a haptic actuation logic. The processor-executable instructions may be executable to provide a variety of functionality including, by way of example and not limitation, calibration functions, signal/input filtering, force threshold detection, and/or haptic feedback, to name a few.

FIG. 4 shows a cross-section of a simplified exemplary force-sensing touchpad 400 that is configured to provide haptics using the techniques described herein. While the touchpad 400 is configured to detect the Z finger position using the new techniques described herein, it is configured to detect X/Y finger position using conventional approaches, such as conventional resistive, capacitive, and/or optical touch sensors. As depicted in FIG. 4, the touchpad 400 uses a conventional capacitive touch sensor to detect X/Y finger position.

The touchpad 400 of FIG. 4 illustrates an example of incorporating the new-force sensing technology described herein with products and solutions that use existing touch-position detection technology. This approach allows for a much greater level of user interactivity than the conventional approach alone. With this approach, a casual and inadvertent slight touch can be ignored. Instead, only a purposeful touch applied with at least a measured force exceeding a defined amount will trigger a response from the host device (which the touchpad is attached thereto) with this approach incorporated therein.

The exemplary force-sensing touchpad 400 includes a touchsurface 404, a capacitive touch sensor 406, an actuation mechanism 410, a sensor-actuator separator layer 416 and multiple capacitive sensors (as represented by capacitive strips 412, 414 in FIG. 4). For context, FIG. 4 shows the user's finger 202 hovering over the touchsurface 404 in anticipation of touching the touchsurface.

The actuation mechanism 410 of the touchpad 400 is constructed like, and functions like, the actuation mechanism 310 of the touchpad 300 described above. As such, the actuation mechanism includes at least a pair of spaced-apart planes, which are an upper and a lower actuation plane 430 and 440, respectively. The planes are held apart by a return mechanism, as represented in FIG. 4 as springs 442 and 444. As its name implies, the return mechanism also returns the planes back to their original position after an actuation and/or movement in the Z direction. Between the planes is a defined actuation gap 420 and in that gap are an air space and a dielectric 432. A conductive layer 434 is attached to the underside of the lower actuation plane 440 between the multiple capacitive sensors (e.g., capacitive strips 412, 414).

The force-measuring capacitive touch technology (which includes one or more capacitive sensors, such as strips 412, 414) detects movement of the touchsurface 404 in the Z direction by a change in one or more capacitive circuits (such as circuits 422 and 424). The Z direction is represented by Z vector arrow 450.

With the touchpad 400, one or more capacitors are formed between the upper actuation plane 430 and each of the capacitive sensors (e.g., capacitive strips 412, 414) below the lower actuation plane 440. In this way, the upper actuation plane 430 and the capacitive sensors form the capacitor planes (e.g., first and second planes) of one or more capacitors.

Like the touchpad 300, the touchpad 400 provides active tactile feedback via its actuation mechanism, namely mechanism 410. Also, like the touchpad 300, the touchpad 400 detects the Z position of the user's finger 202 pressing down on the touchsurface 404 using its force-measuring capacitive touch technology (which includes one or more capacitive sensors, such as strips 412, 414).

However, unlike touchpad 300, this touchpad 400 detects the X/Y position of the user's finger 202 using some other touch sensing approach. That other approach may include conventional and future approaches. Examples of conventional approaches that may be used for X/Y detection include (but are not limited to): resistive, capacitive, and/or optical touch sensors. As depicted, the touchpad 400 uses the capacitive touch sensor 406 and, consequently, there is a capacitive circuit 408 between the sensor 406 and the user's finger 202.

Another Exemplary Force-Sensing Touchpad

FIGS. 5-7 offer three different views of an exemplary force-sensing touchpad 500 that is configured to implement the techniques described herein to detect X/Y/Z finger position and/or provide active tactile user feedback to a user's finger touching the touchpad. FIG. 5 is an isometric view of the exemplary force-sensing touchpad 500. FIG. 6 is top plan view of the touchpad 500. FIG. 7 is a side elevation view of the touchpad 500. As depicted in FIGS. 5-7, the exemplary force-sensing touchpad 500 includes a top cap 502, a touchsurface 504, and a housing base 506. Herein, the touchsurface 504 may also be described as a user-engagement surface presented for contact by the user.

Collectively, the top cap 502 and the housing base 506 form, at least in part, the housing or chassis of the touchpad 500.

As described herein, the exemplary force-sensing touchpad 500 includes an electro-mechanical movement-effecting mechanism designed to move an electronically conductive plane using electrostatic forces. This movement is designed to provide active tactile feedback to the user's finger touching the touchsurface 504. Typically, the electronically conductive plane is moved in one or more directions that are towards and/or away from the touchsurface 504.

Figure 8:
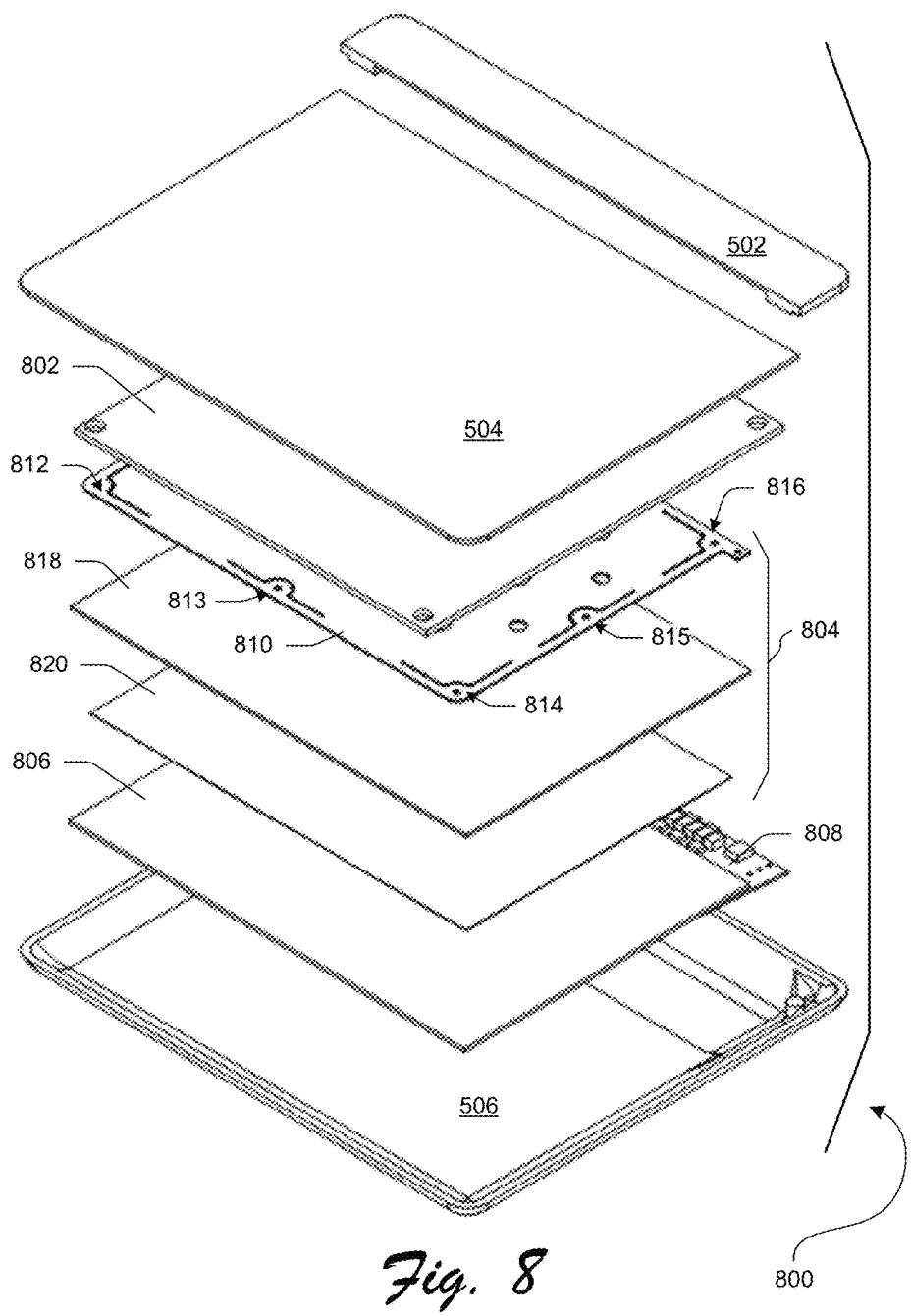
FIG. 8 is an exploded view of the fourth implementation of the capacitive force-sensing touchpad.

FIG. 8 shows an exploded view of an exemplary assembly 800 of the touchpad 800. The exemplary assembly 800 includes the top cap 502, the touchsurface 504, a sensor board 802, an actuation mechanism 804, a spacer 806, a controller board 808, and the housing base 506. The exemplary assembly 800 of the exemplary force-sensing touchpad 800, as depicted, is one example of how the touchpad described herein may be assembled within the scope of the claims appended hereto.

The top cap 502 is an ornamental and functional cover and bezel. The touchsurface 504 is the touch-sensitive surface presented to the user for contact therewith. The sensor board 802 includes one or more force-sensing capacitance sensors that are configured to measure a change in capacitance that is calibrated with defined forces applied to the touchsurface 504. Using the sensors built into specified locations on and/or within the sensor board 802, the touchpad 500 may determine the X/Y position of the user's finger on the touchsurface 504 by calculating the centroid of force based upon the varying input from the sensors.

Also, using one or more of the sensors built into specified locations on and/or within the sensor board 802, the touchpad 500 may also determine the Z position of the user's finger. Herein, the Z position relates to the displacement of the touchsurface 504 to and from its original position (before a user presses down on it). With that displacement calibrated to a defined force scale, the force that the user applies to the touchsurface 504 can be determined.

The spacer 806 is an inert material filling space between the actuation mechanism 804 and the housing base 506. The controller board 808 includes logic to handle and manage various aspects of the touchpad 500 functionality, such as the sensors of the sensor board 802 and driving the actuation mechanism 804.

The actuation mechanism 804 provides the active tactile feedback (i.e., haptics) to the user. The actuation mechanism 804 includes an upper actuation plane 810, a return mechanism, a dielectric layer 818, and a lower actuation plane 820. The actuation mechanism 804 holds at least a pair of electrically conductive planes (e.g., upper actuation plane 810 and lower actuation plane 820) in a spaced-apart position with a defined gap therebetween. As depicted herein, the upper actuation plane 810 is an electrically conductive plane of sheet metal. The lower actuation plane 820 is an electrically conductive film adhered to the spacer 806.

As shown in FIG. 8, the return mechanism is represented herein by leaf springs 812, 813, 814, 815, 816 that are built into the upper actuation plane 810. The return mechanism is operably associated with (e.g., integrated with, connected to, or coupled to) at least one of the pair of actuation planes (e.g., upper actuation plane 810 and lower actuation plane 820). The return mechanism is designed to return the pair of planes, after a movement of the planes relative to each other, back to the spaced-apart position relative to each other and restore the defined gap therebetween. That is, the return mechanism restores the defined gap between the actuation planes.

FIG. 9 shows the upper actuation plane 810 alone. Integrated into the perimeter of the upper actuation plane 810 are leaf springs 812, 813, 814, 815, 816, 902, 903, and 904. In this embodiment, the upper actuation plane 810 with integrated leaf springs may also be called a "spring plate." Each of the leaf springs (812, 813, 814, 815, 816, 902, 903, and 904) has a hole with which the upper actuation plane 810 is rigidly mounted to the housing base 506 (directly or indirectly). In doing this, the interior of the upper actuation plane 810 may move up and down while the leaf springs remain affixed and unmoving.

The spring plate 810, as depicted in FIG. 9, includes air vents, such as vents 906 and 908, and touchsurface-mounting spaces, such as spaces 910 and 912. The air vents (such as vents 906 and 908) in the spring-plate/upper-actuation-plane 810 allows for the rapid evacuation of air from an air gap between the pair of actuation planes during the actuation and for the rapid re-introduction of air during the return/reset of the actuation mechanism 804. The touchsurface-mounting spaces, such as spaces 910 and 912, are where the spring-plate/upper-actuation-plane 810 is rigidly mounted to the touchsurface 504 above. In this way, the spring-plate/upper-actuation-plane 810 will move (e.g., up and down) in response to the user pressing on the touchsurface 504.

While not shown, the exemplary assembly 800 also includes a return stop that is firmly attached to the housing/chassis of the touchpad and is designed to stop the upward movement of the upper actuation plane 810 on its return from actuation. That upward movement is typically caused by the return mechanism urging the upper actuation plane back to its original position after actuation is released.

FIG. 10 is a cross-section of the exemplary assembly 800 of the exemplary force-sensing touchpad 500 along line A-A shown in FIG. 6. To help illustrate context, the user's finger 202 is shown in FIG. 10 hovering over the touchsurface 504.

FIG. 11 shows an enlargement of a circled portion 1002 of the assembly 800 in FIG. 10. As depicted in FIG. 11, the exemplary assembly 800 includes the touchsurface 504, the sensor board 802, the actuation mechanism 804, the spacer 806, and the housing base 506. A touchsurface-movement clearance 1102 between the touchsurface 504 and the housing base 506 gives the touchsurface 504 room to move relative to the base in a Z direction (as indicated by Z-direction vector 1103). The sensor board 802 includes at least one capacitance-sensing strip 1104, but in other implementations, the board may include multiple strips, which are strategically deployed across the board.

As shown, the actuation mechanism 804 includes the upper actuation plane 810, the dielectric layer 818, and the lower actuation plane 820. The upper actuation plane 810 is grounded (as shown) while the lower actuation plane 820 is charged or electrically active when the actuation mechanism 804 is activated. The actuation mechanism 804 is designed to permit at least one of the actuation planes to move relative to the other. This movement is effective to provide tactile feedback to the user when, for example, the user presses down on the touchsurface 504. This movement may be in response to the performance of a defined on-screen action. Each of the planes 810, 820 has conductive properties. Each plane may be inherently conductive or have, support, include, or otherwise integrate a layer of conductive material.

The upper actuation plane 810 is mounted (either directly or indirectly) to both the touchsurface 504 and the housing base 506. With mounting bracket 1106, the upper actuation plane 810 is rigidly mounted to the touchsurface 504 indirectly by being rigidly mounted to the sensor board 802, which itself it rigidly connected to the touchsurface. The mounting bracket 1106 and other brackets attach to the upper actuation plane 810 via mounting-bracket spaces, such as spaces 910 and 912 (as shown in FIG. 9).

The built-in leaf springs (such as spring 813) are rigidly mounted to the housing base 506 via base-mounting brackets, such as base-mounting bracket 1108. With this arrangement, the interior of the upper actuation plane 810 may move relative to the lower actuation plane 820 while the built-in leaf springs (such as spring 813) remains affixed to the base 506 via its base-mounting brackets (e.g., bracket 1108). The built-in leaf springs (which are the return mechanism) will return the upper actuation plane 810 back to its original position once force is no longer applied to the upper actuation plane 810. Such force may be from the actuation and/or from the user pressing down on the touchsurface 504.

As shown in FIG. 11, there is a defined actuation gap 1110 between the pair of actuation planes (810, 820). Inside that defined actuation gap is the dielectric layer 818 and an air space (i.e., air gap) 1112. The actuation mechanism 804 is configured to provide tactile feedback to a user responsive to a user performing an action, such as pressing down on the touchsurface 504. As shown here with circled portion 1002 of the exemplary assembly 800, the actuation mechanism 804 includes at least two spaced-apart planes (e.g., upper actuation plane 810 and lower actuation plane 820). The actuation mechanism holds this pair of planes in a spaced-apart position relative to each other and with the defined actuation gap 1110 therebetween. In this exemplary assembly 800, the defined actuation gap 1110 defines the distance that the planes 810, 820 are spaced apart. Typically, the defined actuation gap 1110 is substantially smaller than the width of the expanse of the planes. In some implementations, the defined actuation gap 1110 is one micron to one centimeter. In other implementations, the defined actuation gap 1110 is two tenths of a millimeter to two millimeters.

As shown in FIG. 11, a defined capacitance-sensing gap 1114 is located between the capacitance-sensing strip 1104 and the grounded mounted leaf spring 813. A capacitive circuit 1116 is formed in the capacitance-sensing gap 1114 between the strip 1104 and the grounded spring 813. Between the capacitance-sensing strip 1104 and the grounded mounted leaf spring 813, a capacitor is formed with the capacitive circuit 1116 therebetween. In this way, the capacitance-sensing strip 1104 and the grounded mounted leaf spring 813 form the capacitor planes (e.g., first and second planes) of one or more capacitors of the exemplary touchpad 500.

When the user presses on the touchsurface 504, the capacitance-sensing gap 1104 decreases and the capacitance circuit 1116 changes accordingly. The change in the capacitance circuit 1116 (and thus the change is the capacitance-sensing gap 1104) corresponds with the force applied by the user's finger to the touchsurface 504 that causes displacement of the touchsurface 504 in the Z direction. Via programming and configuration, that displacement force is calibrated to the change in the capacitance circuit. The force-sensing logic of the controller board 808 handles the data storage, programming, configuration, customization and management of the force sensing itself.

FIG. 12 shows that same circled portion 1002 and the same components of FIG. 11. However, the components of FIG. 12 are oriented in response to a downward force (as indicated by force vector 1202) applied to the touchsurface 504 by, for example, a user's finger. The key differences between FIGS. 11 and 12 include a decrease in following cavities: the touchsurface-movement clearance 1102, defined actuation gap 1110, air space 1112, and defined capacitance gap 1114. These cavities all decreased in response to the downward force on the touchsurface 504. Also in response to that force, the upper actuation plane 810 is lower than it was illustrated in FIG. 11 and the built-in leaf spring 813 is flexed. Once the force is released, the return mechanism (as represented by the built-in leaf springs here, such as spring 813) return the upper actuation plane 810 to its original position and restores all of the cavities (1102, 1110, 1112, 1114) back to their original position (as shown in FIG. 11).

Components of Exemplary Force-Sensing Touchpad

Figure 13:
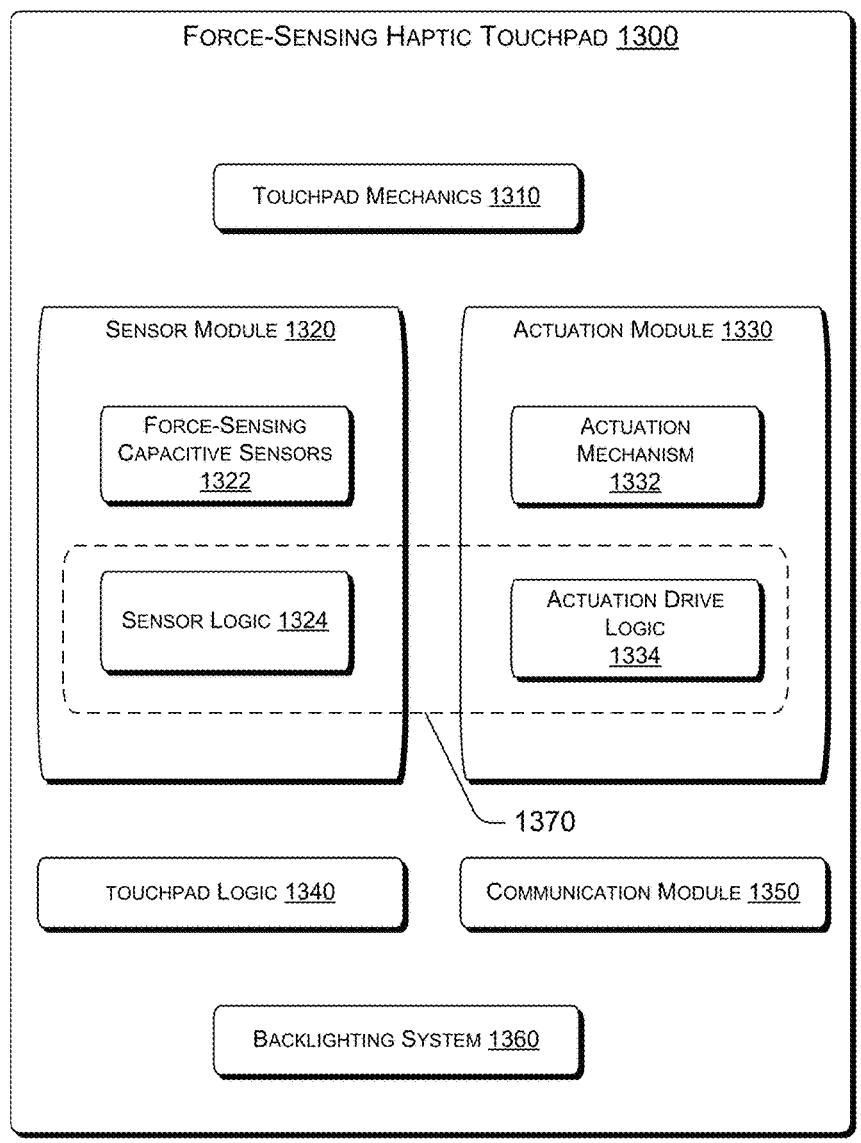
FIG. 13 is a block diagram of components of a fifth implementation of a capacitive force-sensing touchpad configured to implement the techniques described herein.

FIG. 13 illustrates some exemplary components in accordance with one or more embodiments of the force-sensing technology described herein, such as an exemplary force-sensing haptic touchpad 1300. The exemplary touchpad 1300 includes touchpad mechanics 1310, a sensor module 1320, an active-feedback actuation module 1330, touchpad logic 1340, a communication module 1350, and a backlighting system 1360.

The touchpad mechanics 1310 includes the mechanical components of the exemplary touchpad 1300 that are not part of the other components described as part of this exemplary touchpad. For example, such components may include (but are not limited to): a housing and a touchsurface.

The sensor module 1320 is configured to determine the X/Y/Z position of a user's finger on the touchsurface of the touchpad 1300. The sensor module 1320 includes force-sensing capacitive sensors 1322 and sensor logic 1324. The sensor module 1320 also includes circuitry operatively connecting the sensors 1320 to the sensor logic 1322. The herein-described multiple force-sensing capacitive sensors (such as the capacitive strips shown in FIGS. 2, 3, 4, 11, and 12) are examples of the force-sensing capacitive sensors 1322.

The sensor module 1320 may be described as a capacitive force-sensing module that is operably associated with the touchsurface. It may also be described as including at least one capacitor having at least two capacitor planes. Examples of such planes include capacitance-sensing strip 1104 and the grounded mounted leaf spring 813 as shown in FIGS. 11 and 12. At least one of the planes (e.g., capacitance-sensing strip 1104) is operatively associated with the touchsurface (e.g., touchsurface 504). That is, movement in the Z-direction of the touchsurface moves one of the planes (e.g., capacitance-sensing strip 1104) in a corresponding manner.

Furthermore, the sensor module 1320 includes at least one capacitive sensor configured to sense a change in capacitance of the capacitor formed by the two planes. The change in capacitance is caused at least in part by movement of at least one of the capacitor planes (e.g., capacitance-sensing strip 1104) relative to the other of the plane (e.g., leaf spring 813) effective enough to determine a force applied to the touchsurface. In one or more implementations, one or more capacitive sensors include or are operatively coupled to at least one of the capacitor planes (e.g., capacitance-sensing strip 1104).

Moreover, the sensor module 1320 may also include conventional touch sensing technology to detect the X/Y position of a user's finger on the touchsurface. In that case, the force-sensing capacitive sensors 1322 may be used to detect the Z position of the user's finger on the touchsurface. That is, the force-sensing capacitive sensors 1322 may determine the force that the user applies to the touchsurface.

Alternatively, the sensor module may be of the design where a capacitive sense matrix is underneath a flexible top surface such that X/Y position and Z force of a finger or multiple fingers can be determined from a user's interaction with the touchsurface.

The sensor logic 1324 receives the force-sensing signals from the force-sensing capacitive sensors 1322 (and perhaps other conventional touch sensors) and responds accordingly to send signals to the touchpad logic 1340 and/or actuation drive logic 1334 of the active-feedback actuation module 1330.

The active-feedback actuation module 1330 includes an actuation mechanism 1332 and the actuation drive logic 1334. The actuation drive mechanism 1332 corresponds, in this example, to the actuation mechanisms depicted in FIGS. 3, 4, 8, 11, and 12. In response to the appropriate signals from the sensor logic 1324, the actuation drive logic 1334 fires the actuation mechanism 1332 with the appropriate timing and characteristics. The actuation drive logic 1334 is designed to drive the actuation planes, which have conductive properties, with an electrical signal to cause the permitted movement of at least one of the planes relative to the other of the planes effective to provide tactile feedback to the user.

A combination of the actuation drive logic 1334 and at least a portion of the sensor logic 1324 may be called a haptic logic 1370. Alternatively, the haptic logic 1370 may be a component that replaces some or all of the functionality of the actuation drive logic 1334 and the sensor logic 1324.

The touchpad logic 1340 interprets the signals sent from the sensor logic 1324 to determine the X/Y/Z position of the user's finger on the touchsurface. The touchpad logic 1340 sends that determination to the host computer via the communication module 1350.

The communications module 1350 is operatively connected to the host computer. That connection may be wired or wireless. The communications module 1350 receives the X/Y/Z determinations from the touchpad logic 1340 and sends that information on to the host computer.

The backlighting system 1360 includes one or more lighting elements that are positioned so a user, through a transparent and/or translucent touchsurface, can see the light. In some implementations, the backlighting system 1360 may be designed to light specific areas of the touchsurface.

Any suitable hardware, software, and/or firmware can be used to implement the sensor logic 1324, the actuation drive logic 1334, the touchpad logic 1340, the haptics logic 1370, and the communication module 1350.

Exemplary Applications for Force-Sensing Technology

Consider, for example, a device with a touchscreen for user input. Examples of such device include (but are not limited to): a smartphone (such as Apple's iPhone™) or a tablet computing device (such as Apple's iPad™), or an in-car navigation system. It is common for a user's casual and inadvertent touch of the touchscreen of one of these devices to be mistakenly accepted as an intentional input from the user. These devices typically have no way of discriminating between a very light inadvertent touch from a purposeful press of their touchscreen.

Fortunately, the new force-sensing technology described herein may help reduce input mistakes caused by an inadvertent light touch on their touchscreens. This may be accomplished by discriminating between an inadvertent light touch from a purposeful press by measuring the force with which the user presses the touchscreen.

Also, consider a touch panel monitor using new force-sensing technology described herein that allows a user to track around on the input surface with a light touch without triggering an actual input. When the user presses harder on the same input surface, a purposeful input is detected and a selected button is activated.

Further, in at least some embodiments using the new force-sensing technology described herein, a user can roll-over or browse icons with a light-force, purposeful touch to enlarge icons for better visibility. Then, with the icon enlarged, a harder press by the user activates that icon. Alternately or additionally, interaction with icons can be force dependent. For example, pressing lightly may allow a user to drag and drop an icon, while pressing harder may open a menu of associated actions that can be performed in relation to the file or program linked to the icon.

As an example, a haptic actuator (such as an electrostatic haptic actuator with integrated capacitive force sensor components like that shown in FIGS. 3-12, could be located behind a display screen (e.g., a liquid crystal display (LCD)) of a device such as a smartphone or tablet computer. In at least some embodiments, a sheet metal backer of the LCD can be used as a grounded conductive layer for capacitive force sensing and/or electrostatic haptic feedback. An existing sensor located proximate the surface of the device's display screen could be used to determine X/Y position. The electrostatic actuator with integrated capacitive force sensor could be implemented to provide force detection and haptic feedback for user interaction, such as, by way of example and not limitation, on-screen typing, gaming, and internet browsing.

In some implementations, by combining force sensing with accelerometers, the device could automatically adjust the activation pressure threshold based on the vibrations it detects, so when a user is jogging or driving on a rough road, the screen could increase the required force to activate, so that light, accidental bumps do not cause random presses.

Another example that integrates two additional sensing technologies would be in an inductive-proximity sensing drawing tablet or input device (such as that offered by Wacom™). The traditional capacitive-sensing technology can be used for the X/Y location, the new force-sensing technology can be used for the Z-direction force (and possibly X/Y touch area), and then the inductive-proximity sensing can be used to detect the angle of the pen to allow 4-dimensional data collection. This could be used in a digital image manipulation application to change the size, flow, and position of the brush tool at the same time.

In at least some embodiments, force measuring capacitive touch technology can be implemented to provide redundant switch mechanisms to reduce accidental selections, interactions, and/or software triggers. For example, a touch screen medical device may require an on-screen key to be pressed with a certain force before triggering a corresponding software event. In another example, an on-screen switch or knob of a touch screen control panel may be configured with a force threshold for changing a position/selection. As another example, consider a screen lock on a mobile touch screen device enabled with force measuring capacitive touch technology. The screen lock may be configured to require a user to press and hold an onscreen button/key with at least a certain amount of force before displaying an interactive gesture driven lock mechanism (e.g. slide, tap, or motion to unlock) to the user.

In other embodiments, capacitive force sensing technology can be implemented in existing input devices, such as mice or track ball devices. In still other embodiments, capacitive force sensing technology may be implemented in support structures associated with an input device, such as mouse pads. For instance, by way of example and not limitation, buttons or surfaces of a mouse could be configured to detect force, allowing a user to interact with UI elements or applications differently depending on force applied to various area and/or buttons of a mouse. For example, changing mouse/pointer speed could be a function based on force applied to a surface of a mouse. Alternately or additionally, in at least some embodiments, a button of a mouse or trackball device could be configured to provide a wide variety of functionality based on varying force applied to the button. In some instances this could lead to a reduction of buttons, as functions of buttons may be combined and utilized based on varying levels of force instead of requiring individual switches for each button.

Exemplary Processes

Figure 14:
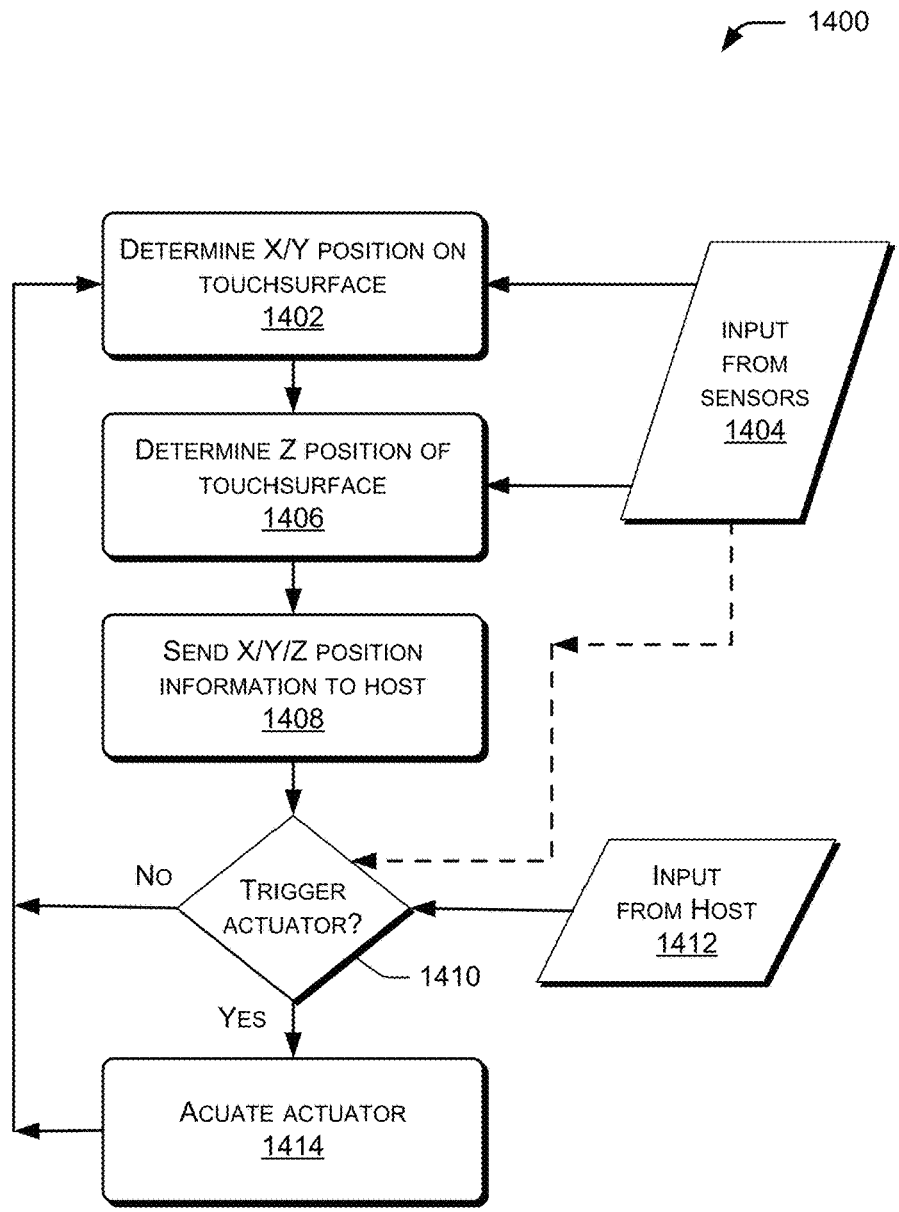
FIGS. 14 and 15 are flow diagrams of one or more exemplary processes, each of which implements the techniques described herein.
Figure 15:
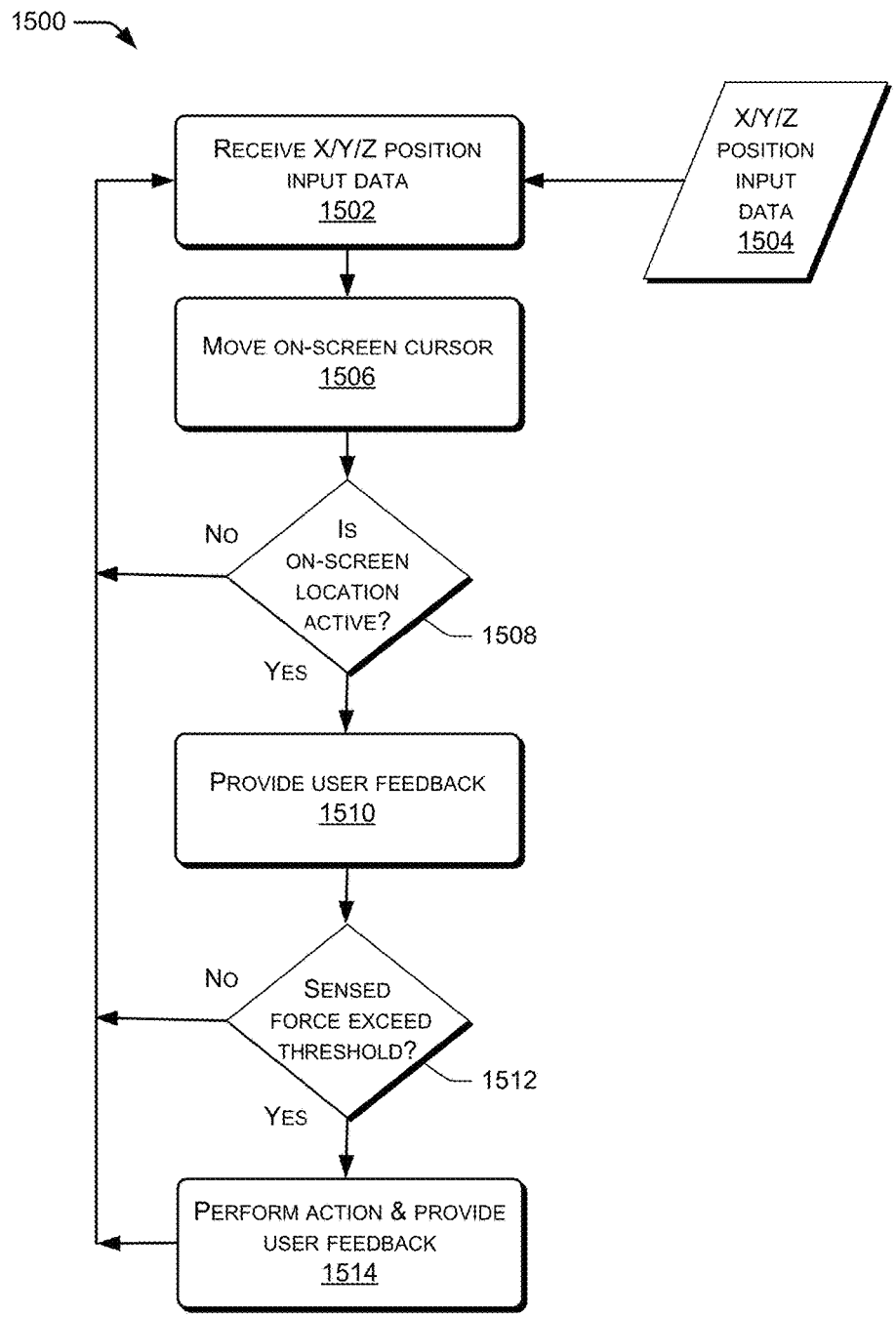

FIGS. 14 and 15 are flow diagrams illustrating exemplary processes 1400 and 1500 that implement the techniques described herein for the new capacitive force-sensing touchpad technology.

FIG. 14 illustrates the example process 1400 for detecting X/Y/Z position of a user's finger on the touchsurface of a touchpad and performing an active tactile feedback by that touchpad. The process 1400 is performed, at least in part, by a touchpad, which includes, for example, the exemplary force-sensing touchpads shown in FIGS. 3-8 and 10-13 and described herein.

As shown here, the process 1400 begins with operation 1402, where the touchpad determines the X/Y position of the user's finger on the touchsurface of the touchpad. The touchpad makes this determination based upon input from one or more of its touch-sensing or force-sensing sensors as indicated at 1404.

The touchpad may use the new techniques described herein for determining the X/Y position based upon triangulation and/or interpolation of force-sensing capacitance changes as measured by multiple capacitive sensors/springs strategically located across the landscape under the touchsurface. Alternatively or in addition, the touchpad may employ conventional or some future touch sensing technology to locate the X/Y position of the user's finger on the touchsurface.

Next, at operation 1406, the touchpad determines the Z position of the user's finger on the touchsurface of the touchpad. That is, the touchpad determines the amount of deflection of the touchsurface caused by the user pressing down thereon. The touchpad makes this determination based upon input from one or more of its force-sensing sensors as indicated at 1404. The deflection of the touchsurface causes the measured capacitance of the one or more force-sensing sensors to change accordingly. The force is determined based upon a known, specified, predefined, previously determined, and/or calculated correspondence between capacitance, deflection, and resistance (i.e., spring bias) of the touchpad's resistance mechanism or actuation mechanism. The range of finger-press force (applied by the user's finger) on the touchsurface is typically between 10-150 grams of force.

Next, at operation 1408, the touchpad sends the X/Y/Z position information to a host device (e.g., a connected computer). With this information, the host device often directs the navigation of an on-screen cursor for user interactivity with the host device. The Z-position information may be used for many purposes including (for the purpose of illustration only and not limitation): icon selection (like a single-click of a mouse), icon activation (like a double-click), icon interaction (like a right-click), or other actions (such as drag-and-drop).

At operation 1410, the touchpad determines whether to trigger the actuator. If not, then the process 1400 returns back to the X/Y determination operation 1402. If so, then the process moves onto the operation 1414.

To make this determination, the touchpad obtains input from the host device (as indicted at 1412) and/or it alternatively obtains input from the touch-sensing and/or force-sensing sensors at 1404 (as indicated by a dashed line between 1404 and 1410). In some implementations, the touchpad may simply follow the direction of the host and trigger the actuation mechanism when directed to do so. In other implementations, the touchpad may trigger the actuation mechanism only when the host input permits it. In still other implementations, the touchpad may make a triggering decision without regard to input from the host. When the touchpad makes a triggering decision itself (with or without input from the host), it may do so at least in part based upon input from one or more of its touch-sensing or force-sensing sensors as indicated at 1404.

For example, the touchpad may decide to trigger the actuation mechanism if the host input indicates that the on-screen cursor is over a selectable icon based upon the X/Y position of the user's finger on the touchsurface and the input from the force-sensing sensors indicate an increase in the force with which the user is pressing down on the touchpad.

In some implementations, the actuation mechanism may be triggered at a force of 20 to 120 grams during the downward finger press. In other implementations, the actuation mechanism may be triggered at a force of 40 to 80 grams during the downward finger press. In some implementations, the actuation mechanism may be triggered at a force of 5 to 50 grams during the upward finger release. In other implementations, the actuation mechanism may be triggered at a force of 10 to 30 grams during the downward finger press.

A determination to trigger the actuation mechanism is based, at least in part, upon the circumstances and conditions of the finger press. The circumstances and conditions may be part of a haptic profile. For example, a determination to trigger the actuation mechanism may be made during the downward motion of the finger press and at one or more specified forces. Also, for example, a determination to trigger the actuation mechanism may be made during the upward motion of the finger press and at one or more specified forces.

During a full finger press (both down and up), the actuation mechanism may be triggered multiple times. The actuation mechanism may be triggered once during the downward finger press and once during the upward finger press. In response to detecting that the user is holding a key down for a defined period of time (without lifting his finger), the haptic profile may indicate that a decision be made to repeatedly and/or periodically trigger the actuation mechanism until, of course, the user lifts his finger.

For example, the actuation mechanism may be triggered once when the on-screen cursor (as directed by the user's X/Y position movements on the touchsurface) rolls over an icon. Once over that icon, the actuation mechanism may be triggered twice when the user selects that icon by pressing down harder at the point on the touchsurface.

At operation 1414, the actuation mechanism is triggered in response to a determination at operation 1412 to do so. When triggering the actuation mechanism, many different factors may be applied. Examples of such factors include (but are not limited to): amount of voltage, rate of application of that voltage, how long the actuation is held, when the actuation is released, the rate of the release of the actuation voltage, etc. Depending upon various factors (including the set haptic profile and the current finger press conditions), different combination of the factors may be utilized in a given actuation. After an actuation triggering, the process returns back to the X/Y determination operation 1402.

The process 1400 continues as long as the touchpad is active and in use. A particular haptic profile may be set at anytime without halting process 1400.

Of course, there may be several variations of the process 1400 as depicted that would be suitable to implement the new capacitive force-sensing techniques described herein. For example, the data flow may vary depending on mode or design. Process could proceed directly from the force-determination operation at 1406 to the actuation-triggering operations 1410 in a "passive" mode where everything is handled at the controller level and the decision to trigger or not is based on a predefined threshold in memory. An alternative process could feed all the X/Y/Z input data to the host and then have the host exclusively decide when to perform the operations of 1408, 1412, and/or 1414.

FIG. 15 illustrates the example process 1500 for user interactivity utilizing a touchpad with the new force-sensing technology described herein. A computing device performs the process 1500, at least in part.

As shown here, the process 1500 begins with operation 1502, where the computing device receives X/Y/Z input data from a touchpad with the new force-sensing technology described herein. The input data includes the X/Y/Z position information regarding the user's finger on the touchsurface of the touchpad. The touchpad of operation 1408 of process 1400 of FIG. 14 sends the kind of information received from 1504.

Next, at operation 1506, the computing device moves an on-screen cursor in accordance with and corresponding to the X/Y position information of the received X/Y/Z input data 1504. This action is, at least in part, like the typical action of coordinating the input from a pointing device to cursor movements of an on-screen user interface.

At operation 1508, the computing device determines whether the on-screen cursor is located over an active area of the user-interface. An active area includes (but is not limited to): icons, balloons, check boxes, command buttons, command links, drop-down lists and combo boxes, links, list boxes, list views, notifications, progress bars, progressive disclosure controls, radio buttons, search boxes, sliders, spin controls, status bars, tabs, text boxes, tooltips, infotips, tree views, window frames, menus, toolbars, ribbons, etc. If the on-screen cursor is not located over an active area, then the process returns back to the beginning, which is the operation 1502.

Otherwise, at operation 1510, when the on-screen cursor is located over an active area, the computing device facilitates providing feedback to the user to indicate the current condition (which is that the cursor is located over an active area). Such feedback may include audio, visual, and/or tactile aspects.

Audio feedback may include (by way of example and not limitation): a beep, sound effect, or musical tones. Visual feedback may include (by way of example and not limitation): changes of color, visual effects (e.g., blinking), shadowing, or other on-screen visual changes in the user interface. Tactile feedback may include (by way of example and not limitation): one or more triggerings of the haptic actuator of the touchpad.

For example, consider a user moving an on-screen cursor with a touchpad equipped with the new force-sensing technology described herein. When the user-directed cursor rolls over a selectable icon while the user uses only a light-force purposeful touch, the computing device may respond by highlighting (e.g., enlarging) the icon for better visibility. The opposite may happen when the cursor rolls off the icon.

Moreover, the computing device may direct the touchpad to deliver a single actuation when the cursor rolls over the icon and another when the user rolls off the icon. In this way, the user effectively "feels" an edge to the icon as she rolls on and off the icon. Therefore, the user gets additional confirmation when the cursor is over a selectable icon.

At operation 1512, the computing device determines whether the Z position information of the received X/Y/Z input data 1504 exceeds one or more thresholds (e.g., 40 g, 60 g, 80 g, and 100 g). That is, does input data from the touchpad indicate that the user is pressing down on the touchsurface hard enough to trigger a response thereto? If not, then the process returns back to operation 1502. If so, then the process proceeds to the next operation.

Next, at operation 1514, the computing device performs one or more associated actions (such as executing an application on the computing device). The specific associated action performed may depend upon many factors (such as on-screen context and proximity of the cursor, amount much force applied by the user, and timing of the application of that force). Associated actions may include (by way of example only and not limitation): accessing a file, menu pull down, menu selection, icon selection, program execution, properties access, single-click type function, double-click type function, and right-click type function, viewing and/or selecting balloons, viewing and/or selecting check boxes, selecting a command button, selecting a command link, dropping down a drop-down list and/or combo boxes, opening a link, viewing and/or selecting list boxes, viewing and/or selecting list views, viewing and/or selecting notifications, viewing and/or selecting progress bars, viewing and/or selecting progressive disclosure controls, viewing and/or selecting radio buttons, viewing and/or selecting search boxes, viewing and/or selecting sliders, viewing and/or selecting spin controls, viewing and/or selecting status bars, viewing and/or selecting tabs, viewing and/or selecting text boxes, viewing and/or selecting tooltips, viewing and/or selecting infotips, viewing and/or selecting tree views, viewing and/or selecting windows, viewing and/or selecting menus, viewing and/or selecting toolbars, viewing and/or selecting ribbons, dragging and/or dropping functions, copying functions, cutting functions, pasting functions, and cut-and-pasting functions.

In addition or in the alternative, at operation 1514, the computing device provides additional user feedback. Such feedback may include audio, visual, and/or tactile aspects. Then the process returns to operation 1502.

To continue the example described above with the enlarged icon, the user may simply press harder on the touchsurface to take further action based upon that icon. In other words, the user need not lift her finger to click on a button. Rather the user may keep her finger on the touchsurface and indicate her desire to select the icon by pressing harder. Of course, how hard the user presses may indicate different choices. For example, pressing at least one low level (e.g., 40 grams) indicates a single-click, pressing a bit harder (e.g., 60 grams) indicates a double-click, and even harder (e.g., 80 grams) may mean a right-click.

Thus, with some implementations, interaction with icons and other active areas can be force dependent. For example, pressing lightly may allow a user to drag and drop an icon, while pressing harder may open a menu of associated actions that can be performed in relation to the file or program linked to the icon.

In situations where no cursor exists (e.g., with a touchscreen), the same actions are performed but without displaying a cursor per se. Instead, the location of interest is tracked based upon the position input data.

Exemplary Computing System and Environment

Figure 16:
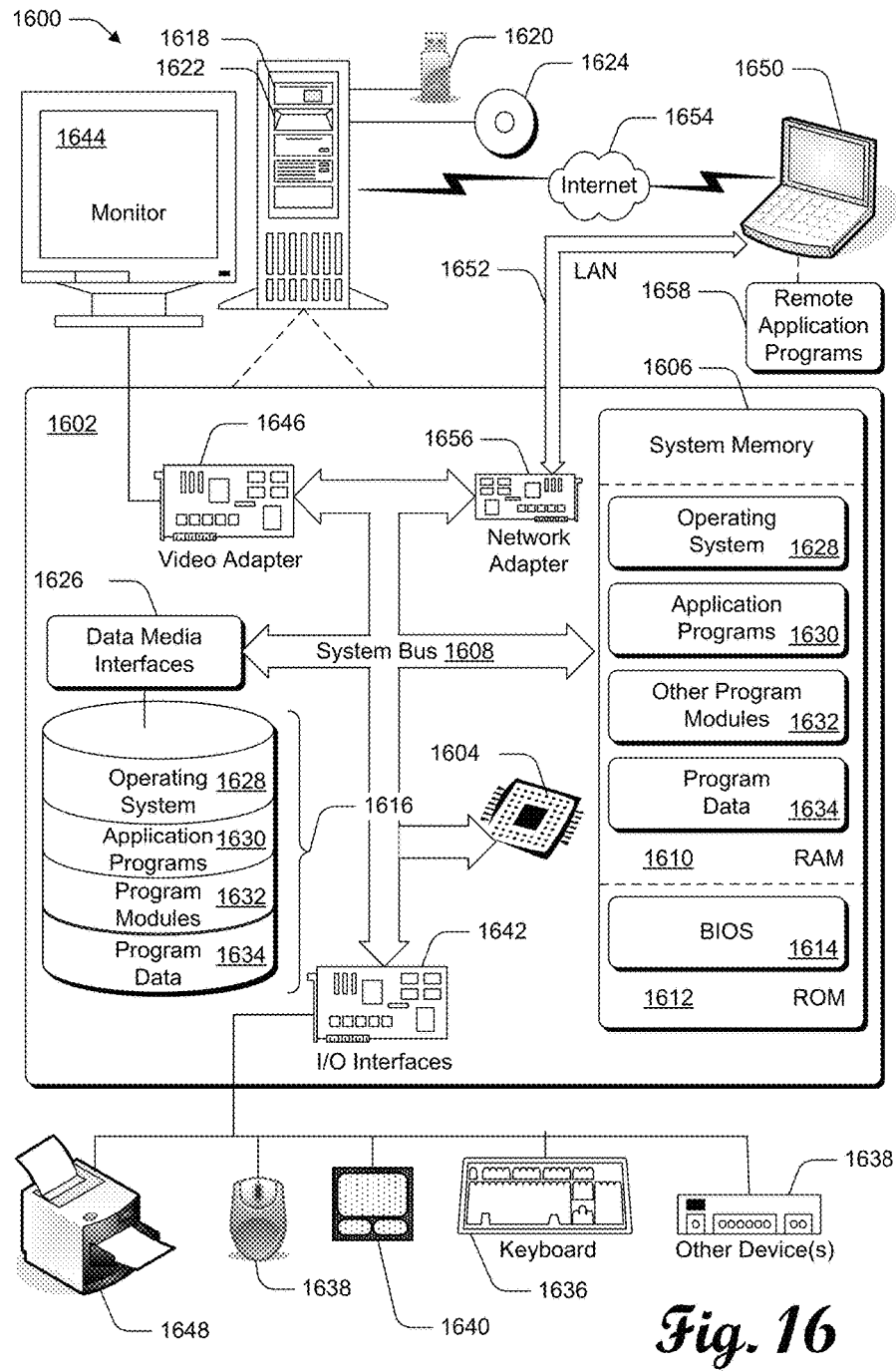
FIG. 16 illustrates an exemplary computing environment suitable for one or more implementations of the techniques described herein.

FIG. 16 illustrates an example of a suitable computing environment 1600 within which one or more implementations, as described herein, may be implemented (either fully or partially). The exemplary computing environment 1600 is only one example of a computing environment and is not intended to suggest any limitation as to the scope of use or functionality of the computer and network architectures. Neither should the computing environment 1600 be interpreted as having any dependency or requirement relating to any one or combination of components illustrated in the exemplary computing environment 1600.

The one or more implementations, as described herein, may be described in the general context of processor-executable instructions, such as program modules, being executed by a processor. Generally, program modules include routines, programs, objects, components, data structures, etc. that perform particular tasks or implement particular abstract data types.

The computing environment 1600 includes a general-purpose computing device in the form of a computer 1602. The components of computer 1602 may include, but are not limited to, one or more processors or processing units 1604, a system memory 1606, and a system bus 1608 that couples various system components, including the processor 1604, to the system memory 1606.

The system bus 1608 represents one or more of any of several types of bus structures, including a memory bus or memory controller, a peripheral bus, an accelerated graphics port, and a processor or local bus using any of a variety of bus architectures.

Computer 1602 typically includes a variety of processor-readable media. Such media may be any available media that is accessible by computer 1602 and includes both volatile and non-volatile media, removable and non-removable media.

The system memory 1606 includes processor-readable media in the form of volatile memory, such as random access memory (RAM) 1610, and/or non-volatile memory, such as read only memory (ROM) 1612. A basic input/output system (BIOS) 1614, containing the basic routines that help to transfer information between elements within computer 1602, such as during start-up, is stored in ROM 1612. RAM 1610 typically contains data and/or program modules that are immediately accessible to and/or presently operated on by the processing unit 1604.

Computer 1602 may also include other removable/non-removable, volatile/non-volatile computer storage media. By way of example, FIG. 16 illustrates a hard disk drive 1616 for reading from and writing to a non-removable, non-volatile magnetic media (not shown), a magnetic disk drive 1618 for reading from and writing to a removable, non-volatile flash memory data storage device 1620 (e.g., a "flash drive"), and an optical disk drive 1622 for reading from and/or writing to a removable, non-volatile optical disk 1624 such as a CD-ROM, DVD-ROM, or other optical media. The hard disk drive 1616, flash drive 1618, and optical disk drive 1622 are each connected to the system bus 1608 by one or more data media interfaces 1626. Alternatively, the hard disk drive 1616, magnetic disk drive 1618, and optical disk drive 1622 may be connected to the system bus 1608 by one or more interfaces (not shown).

The drives and their associated processor-readable media provide non-volatile storage of processor-readable instructions, data structures, program modules, and other data for computer 1602. Although the example illustrates a hard disk 1616, a removable magnetic disk 1620, and a removable optical disk 1624, it is to be appreciated that other types of processor-readable media, which may store data that is accessible by a computer, such as magnetic cassettes or other magnetic storage devices, flash memory cards, floppy disks, compact disk-(CD-), digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1616, magnetic disk 1620, optical disk 1624, ROM 1612, and/or RAM 1610, including, by way of example, an operating system 1628, one or more application programs 1630, other program modules 1632, and program data 1634.

A user may enter commands and information into computer 1602 via input devices such as a keyboard 1636 and one or more pointing devices, such as mouse 1638 or touchpad 1640. Other input devices 1638 (not shown specifically) may include a microphone, joystick, game pad, satellite dish, serial port, scanner, and/or the like. These and other input devices are connected to the processing unit 1604 via input/output interfaces 1642 that are coupled to the system bus 1608, but may be connected by other interfaces and bus structures, such as a parallel port, game port, or a universal serial bus (USB).

A monitor 1644 or other type of display device may also be connected to the system bus 1608 via an interface, such as a video adapter 1646. In addition to the monitor 1644, other output peripheral devices may include components, such as speakers (not shown) and a printer 1648, which may be connected to computer 1602 via the input/output interfaces 1642.

Computer 1602 may operate in a networked environment using logical connections to one or more remote computers, such as a remote computing device 1650. By way of example, the remote computing device 1650 may be a personal computer, portable computer, a server, a router, a network computer, a peer device or other common network node, and the like. The remote computing device 1650 is illustrated as a portable computer that may include many or all of the elements and features described herein, relative to computer 1602. Similarly, the remote computing device 1650 may have remote application programs 1658 running thereon.

Logical connections between computer 1602 and the remote computer 1650 are depicted as a local area network (LAN) 1652 and a general wide area network (WAN) 1654. Such networking environments are commonplace in offices, enterprise-wide computer networks, intranets, and the Internet.

When implemented in a LAN networking environment, the computer 1602 is connected to a wired or wireless local network 1652 via a network interface or adapter 1656. When implemented in a WAN networking environment, the computer 1602 typically includes some means for establishing communications over the wide network 1654. It is to be appreciated that the illustrated network connections are exemplary and that other means of establishing communication link(s) between the computers 1602 and 1650 may be employed.

In a networked environment, such as that illustrated with computing environment 1600, program modules depicted relative to the computer 1602, or portions thereof, may be stored in a remote memory storage device.

Additional and Alternative Implementation Notes

Unless the context indicates otherwise, the terms "touchsurface," "touch surface," or "touchscreen," "touch screen," or the like refer to the touch-sensitive surface that the exemplary touchpad presents to the user for physical contact therewith. In some implementations, the touchsurface of the exemplary touchpad may be opaque. In other implementations, the touchsurface of the exemplary touchpad may be translucent or transparent.

The implementations of a force-sensing touchpad, depicted herein, are stand-alone touchpads rather than integrated with a computer, like the touchpads of a laptop computer. Of course, alternative implementations may have a touchpad integrated within the housing or chassis of the computer or other device. The following are examples of devices and systems that may use or include one or more implementations of a force-sensing touchpad, depicted herein, like the exemplary force-sensing touchpad 500 (by way of example only and not limitation): a mobile phone, electronic book, computer, laptop, tablet computer, netbook, stand-alone trackpad, input device, monitor, electronic kiosk, gaming device, automated teller machine (ATM), vehicle dashboard, control panel, medical workstation, and industrial workstation.

The following U.S. patent applications are incorporated by reference herein:

U.S. patent application Ser. No. 12/580,002, filed on Oct. 15, 2009;
U.S. Provisional Patent Application Ser. No. 61/347,768, filed on May 24, 2010;
U.S. Provisional Patent Application Ser. No. 61/410,891, filed on Nov. 6, 2010; and
U.S. patent application Ser. No. 12/975,733, filed on Dec. 22, 2010.

In a touchpad with the new force-sensing technology described herein, the capacitive sensors (e.g., 312, 314) are the force-sensing components. In at least some other embodiments, the components of force sensing can be provided via a substrate configured to support a layer of conductive material and/or sensor material such as ITO, silver, or copper to name a few. Alternately or additionally, in at least some embodiments, a substrate may support a layer of ITO, which may be etched to provide a sense pattern, and/or a conductive layer suitable for electrostatic haptic feedback. In at least some embodiments, vapor deposition may be used to coat a substrate with conductive material to provide a suitable sense pattern and/or conductive layer suitable for electrostatic haptic feedback.

In other embodiments, a substrate may include a printed circuit board configured to provide a sense pattern and/or a conductive layer suitable for providing electrostatic feedback. Further, in at least some embodiments, strips of conductive material, such as copper or metallic tape, may be utilized to provide either conductive layer or sensor elements. Alternately or additionally, adhesive backed conductive material may be die cut into suitable patterns to provide a sense pattern.

Unless the context indicates otherwise, the term "housing" as used herein also includes a chassis or other framework designed to hold or retain the components of the haptic keyboard described herein and possibly other computing components (e.g., a CPU, memory, graphics processor, hard drive, I/O subsystems, network communications subsystems, etc.).

Herein, the user is described as touching or pressing the touchsurface of the exemplary force-sensing touchpad. While users typically touch a touchsurface with their fingers, it should be understood by those of ordinary skill in the art that user is not limited to touching the touchsurface with his finger. Alternatively, the user may use another body part or use a tool (e.g., a pencil, pen, or stylus) to touch the touchsurface.

The actuation mechanism (such as actuation mechanisms 210, 310, 410, and 804) is described herein as producing a movement to effect a tactile feedback to a user by using electrostatic forces to attract a pair of conductive planes. In alternative embodiments, the movement may be cause by other types of electro-mechanical actuators, which include (but are not limited to) those based upon: electroactive polymers (EAP), piezoelectric, solenoids, and the like.

The actuation mechanism (such as actuation mechanisms 210, 310, 410, and 804) is described herein as having a pair of actuation planes (such as 810 and 820). Alternative assemblies of the force-sensing touchpad may include more than just the pair of planes. Those alternative assemblies may include a defined gap between each pair of stacked-up and spaced-apart planes. This effectively creates a layered stack of multiple actuation mechanisms.

Depending upon the particular implementation, each of the actuation planes (such as 810 and 820) may also be described, in whole or in part, as a layer, plate, stratum, substrate, laminate, sheet, film, coating, page, blanket, strip, expanse, foil, leaf, membrane, pane, panel, ply, slab, veneer, or the like.

Some of the actuation planes (such as 810 and 820) depicted herein are shown as a single stratum of material. However, other embodiments may use multiple strata of material to form an actuation plane. For example, some embodiments may use two, three, four, or more layers of material. Regardless of the number of layers used for each plane, one or more layers have conductive properties for electrostatic actuation purposes.

For example, in at least some embodiments, each of the actuation planes (such as 810 and 820) may be formed from or include an electrically conductive material. Examples of conductive material that the planes may include or be formed from include (but are not limited to): silver, iron, aluminum, gold, brass, rhodium, iridium, steel, platinum, tin, indium tin oxide, titanium, copper, or some other sheet metal. The planes may be transparent and/or translucent. In that case, the planes may be, for example, glass or plastic and may have an electrically conductive coating or film (such as a layer of indium-tin-oxide). Other materials can, of course, be utilized without departing from the spirit and scope of the claimed subject matter.

As depicted herein, the actuation mechanism (such as actuation mechanisms 210, 310, 410, and 804) moves at least one of the pair of the actuation planes (such as 810 and 820) down and the return mechanism moves the planes up when actuation is deactivated. This movement can be described as being substantially normal to and/or from the touchsurface (such as touchsurface 504). Alternatively, this movement can be described as being parallel with the movement of the z direction of the touchsurface.

Dielectric material (such as dielectric layer 818) can include any suitable type of dielectric material such as (by way of example and not limitation): air, glass, ceramic, mica, piezo materials, FR4, plastic, paper, elastomeric material, gel and/or other fluidic or non-fluidic material. Although it is not technically a material, a vacuum may operate as an effective dielectric for some implementations. Alternately or additionally, in at least some embodiments, the return mechanism (as represented by springs 442, 444) can be formed from any suitable material, such as plastic, thermoplastic elastomer, metal, and the like.

While depicted in herein (e.g., FIGS. 8 and 9) as leaf springs and in other drawings as other types of springs, the return mechanism may be and/or may include a variety of functional components. The return mechanism is described in additional detail in U.S. patent application Ser. No. 12/975,733 and in U.S. Provisional Patent Application Ser. No. 61/410,891, both of which are incorporated herein by reference.

The actuation mechanisms (such as actuation mechanisms 210, 310, 410, and 804) described herein include a return mechanism, which may also be called a resistance mechanism. In addition to performing actuation for haptics, the actuation mechanism (through its resistance mechanism) also resists a Z-direction (e.g., downward) force applied to the touchsurface by the user.

It is to be appreciated and understood that other types of resistance or return mechanisms can be utilized without departing from the spirit and scope of claimed subject matter. For example, alternative resistance or return mechanisms might resist the down force of the user's finger without biasing or spring forces. This resistance action may be accomplished via repulsion, attraction, or other magnetic or electromagnetic forces. Also, other mechanical actions may restore the gap between the planes.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A haptic force-sensing touchpad comprising:
a user-engagement surface presented for contact by a user;
a first spring plate operably associated with the user-engagement surface, wherein the first spring plate comprises a conductive layer;
a second spring plate operably associated with the first spring plate, wherein the second spring plate comprises:
a first capacitive force sensing strip disposed proximate a first edge of the second spring plate,
a second capacitive force sensing strip disposed proximate a second edge of the second spring plate, and
a conductive interior region disposed between the first capacitive force sensing strip and the second capacitive force sensing strip,
wherein the first spring plate and the second spring plate are spaced-apart with a defined gap therebetween;
a return mechanism operably associated with the first spring plate or the second spring plate;
a touch-sensing module operably associated with the user-engagement surface, the touch-sensing module being configured to determine an X/Y position of contact by the user with the user-engagement surface;
a capacitive force-sensing module operably associated with the user engagement surface, the capacitive force-sensing module being configured to determine a force applied to the user-engagement surface in response to a change in a variable capacitance between the first capacitive force sensing strip and the conductive layer; and
an active-feedback actuation mechanism operably associated with the user-engagement surface, the actuation mechanism configured to provide tactile feedback to the user in response to the force applied to the user engagement surface, wherein the conductive interior region is configured to generate a haptic movement, when activated by the active-feedback actuation mechanism, between the first spring plate and the second spring plate, and wherein the return mechanism is configured to restore, after the haptic movement, the defined gap between the first spring plate and the second spring plate.

2. A haptic force-sensing touchpad as recited in claim 1, wherein the capacitive force-sensing module determines the force applied to the user engagement surface by the user's contact therewith by determining a z direction deflection of the user-engagement surface caused by the force applied to the user-engagement surface.

3. A haptic force-sensing touchpad as recited in claim 1, wherein the touch-sensing module determines the X/Y position of the user's contact with the user-engagement surface by determining the force applied to the user-engagement surface by the user's contact therewith.

4. A haptic force-sensing touchpad as recited in claim 1, further comprising a resistance mechanism operably associated with the user engagement surface and configured to resist a movement of the user engagement surface in at least one direction of Z.

5. A force-sensing apparatus comprising:
a user-engagement surface presented for contact by a user;
a first spring plate operably associated with the user-engagement surface, wherein the first spring plate comprises a conductive layer;
a second spring plate operably associated with the first spring plate, wherein the second spring plate comprises:
a first capacitive force sensing strip disposed proximate a first edge of the second spring plate,
a second capacitive force sensing strip disposed proximate a second edge of the second spring plate, and
a conductive interior region disposed between the first capacitive force sensing strip and the second capacitive force sensing strip,
wherein the first spring plate and the second spring plate are spaced-apart with a defined gap therebetween;
a capacitive force-sensing module operably associated with the user-engagement surface,
the capacitive force-sensing module being configured to determine a force applied to the user-engagement surface in response to a change in a variable capacitance between the first capacitive force sensing strip and the conductive layer; and
an active-feedback actuation mechanism operably associated with the user-engagement surface, the actuation mechanism configured to provide tactile feedback to the user in response to the force applied to the user-engagement surface by the user, wherein the conductive interior region is configured to generate haptic movement, when activated by the active-feedback actuation mechanism, between the first spring plate and the second spring plate.

6. A force-sensing apparatus as recited in claim 5, further comprising a touch-sensing module operably associated with the user engagement surface and configured to determine an X/Y position of a contact by the user with the user-engagement surface.

7. A force-sensing apparatus as recited in claim 5, wherein the capacitive force-sensing module is further configured to move the first spring plate or the second spring plate corresponding to a Z direction deflection of the user-engagement surface, the deflection being caused, at least in part, by the force applied to the user-engagement surface.

8. A force-sensing apparatus as recited in claim 5, further comprising a resistance mechanism operably associated with the user engagement surface and configured to resist a movement of the user engagement surface in at least one direction of Z.

9. A force-sensing apparatus as recited in claim 5, wherein the active-feedback actuation mechanism further comprises:
a return mechanism operably associated with the first spring plate or the second spring plate, wherein the return mechanism is configured to restore, after the haptic movement, the defined gap between the first spring plate and the second spring plate.

10. A force-sensing apparatus as recited in claim 5, wherein the active-feedback actuation mechanism is further configured to provide the tactile feedback to the user in response to an increase in the force applied to the user-engagement surface by the user.

11. A method comprising:
receiving X/Y data from one or more touch sensors regarding a contact by a user on a user-engagement surface of an input apparatus;
based upon the received X/Y data, determining an X/Y position of the contact by the user on the user-engagement surface;
receiving Z data from one or more force sensors regarding deflection of a first spring plate from a second spring plate in a Z direction caused by a force applied to the user-engagement surface by the user's contact therewith, wherein the user engagement surface is operably associated with the first spring plate and the second spring plate;
based upon the received Z data, determining the force applied to the user-engagement surface by the user's contact therewith, wherein the force is determined from a change in a variable capacitance between a conductive layer in the first spring plate and a first capacitive force sensing strip proximate a first edge of the second spring plate;
triggering an active-feedback actuation mechanism of the input apparatus to provide tactile feedback to the user, wherein the triggering is performed in response to, at least in part, the determined force; and
generating, in response to triggering the active-feedback actuation mechanism and using a conductive interior region, haptic movement between the first spring plate and the second spring plate,
wherein the conductive interior region is disposed between the first capacitive force sensing strip and a second capacitive force sensing strip proximate a second edge of the second spring plate.

12. A method as recited in claim 11, further comprising reporting the determined X/Y position and determined force to a host device of the input apparatus.

13. A method as recited in claim 11, wherein the active-feedback actuation mechanism further includes:
a return mechanism operably associated with the first spring plate or the second spring plate, wherein the return mechanism is configured to restore, after the haptic movement, a defined gap between the first spring plate and the second spring plate.

14. A method comprising:
receiving position and force input data from an input device with a user-engagement surface, the position input data indicating an X/Y position of a contact by a user on the user-engagement surface and the force input data indicating a force applied to the user-engagement surface by the user's contact therewith, wherein the force input data corresponds to a change in a variable capacitance between a conductive layer in a first spring plate and a first capacitive force sensing strip in a second spring plate, and wherein the user engagement surface is operably associated with the first spring plate and the second spring plate;
ascertaining whether position input data corresponds with an active area of the displayed user interface;
ascertaining a location of an on-screen cursor based upon the position input data;
moving an on-screen cursor of a displayed user interface in accordance with the position input data;
based, at least in part, upon the ascertained location of the on-screen cursor and the force input data, determining whether to provide an active tactile feedback to the user using a feedback actuation mechanism; and
in response to the determining and using the feedback actuation mechanism, facilitating haptic movement between the first spring plate and the second spring plate,
wherein the haptic movement is facilitated using electrostatic forces generated by a conductive interior region in the second spring plate, and
wherein the conductive interior region is disposed between the first capacitive force sensing strip and a second capacitive force sensing strip in the second spring plate.

15. A method as recited in claim 14, further comprising:
based, at least in part, upon the ascertained location of the on-screen cursor and the force input data, determining whether to perform one or more cursor-position associated functions;
in response to the determining whether to perform, initiating the one or more cursor: position associated functions.

16. A method as recited in claim 15, wherein the one or more cursor-position associated functions is selected from a group consisting of accessing a file, menu pull down, menu selection, icon or button selection, program execution, properties access, cursor positioning, character or image selection, single-click type function, double-click type function, and right-click type function, viewing and/or selecting balloons, viewing and/or selecting check boxes, selecting a command button, selecting a command link, dropping down drop-down lists and/or combo boxes, opening a link, viewing and/or selecting list boxes, viewing and/or selecting list views, viewing and/or selecting notifications, viewing and/or selecting progress bars, viewing and/or selecting progressive disclosure controls, viewing and/or selecting radio buttons, viewing and/or selecting search boxes, viewing and/or selecting sliders, viewing and/or selecting spin control, viewing and/or selecting status bars, viewing and/or selecting tabs, viewing and/or selecting text boxes, viewing and/or selecting tooltips, viewing and/or selecting infotips, viewing and/or selecting tree views, viewing and/or selecting windows, viewing and/or selecting menus, viewing and/or selecting toolbars, viewing and/or selecting ribbons, dragging and/or dropping functions, copying functions, cutting function, pasting function, and cut-and-pasting function.

* * * * *

UNITED STATES PATENT AND TRADEMARK OFFICE
CERTIFICATE OF CORRECTION

PATENT NO. : 10,068,728 B2
APPLICATION NO. : 13/082293
DATED : September 4, 2018
INVENTOR(S) : Andrew P. Huska et al.

Page 1 of 1

It is certified that error appears in the above-identified patent and that said Letters Patent is hereby corrected as shown below:

In the Claims

Claim 15, Column 28, Line 7, the (:) between the words "cursor" and "position", should be changed to a (-).

Signed and Sealed this
Fourth Day of June, 2019

Andrei Iancu
*Director of the United States Patent and Trademark Office*